US008044798B2

(12) United States Patent
Icove et al.

(10) Patent No.: US 8,044,798 B2
(45) Date of Patent: Oct. 25, 2011

(54) PASSIVE MICROWAVE SPEED AND INTRUSION DETECTION SYSTEM

(75) Inventors: David J. Icove, Knoxville, TN (US); Carl T. Lyster, Knoxville, TN (US)

(73) Assignee: Icove and Associates, LLC, Knoxville, TN (US)

( * ) Notice: Subject to any disclaimer, the term of this patent is extended or adjusted under 35 U.S.C. 154(b) by 112 days.

(21) Appl. No.: 12/575,320

(22) Filed: Oct. 7, 2009

(65) Prior Publication Data

US 2010/0079282 A1    Apr. 1, 2010

Related U.S. Application Data

(63) Continuation-in-part of application No. 12/336,822, filed on Dec. 17, 2008, which is a continuation-in-part of application No. 11/931,399, filed on Oct. 31, 2007, now Pat. No. 7,724,134.

(60) Provisional application No. 60/944,217, filed on Jun. 15, 2007.

(51) Int. Cl.
*G08B 13/18* (2006.01)
(52) U.S. Cl. .......................... 340/567; 340/933
(58) Field of Classification Search ............... 340/933, 340/936, 565, 567, 539.26, 691.6
See application file for complete search history.

(56) References Cited

U.S. PATENT DOCUMENTS

| | | | |
|---|---|---|---|
| 3,986,183 A | 10/1976 | Fujiwara | |
| 4,416,552 A | 11/1983 | Hessemer, Jr. et al. | |
| 4,462,022 A | 7/1984 | Stolarczyk | |
| 4,499,470 A | 2/1985 | Stacey | |
| 4,532,932 A | 8/1985 | Batty, Jr. | |
| 4,583,869 A | 4/1986 | Chive et al. | |
| 4,605,012 A | 8/1986 | Ringeisen et al. | |
| 4,645,358 A | 2/1987 | Blume | |
| 4,715,727 A | 12/1987 | Carr | |
| 4,798,209 A | 1/1989 | Klingenbeck et al. | |
| 5,176,146 A | 1/1993 | Chive | |

(Continued)

FOREIGN PATENT DOCUMENTS

EP    1944591    7/2008

(Continued)

OTHER PUBLICATIONS

CRAF Handbook for Radio Astronomy, European Science Foundation, 2005.

(Continued)

*Primary Examiner* — Thomas Mullen
(74) *Attorney, Agent, or Firm* — PCT Law Group, PLLC

(57) ABSTRACT

A passive microwave receiver, receiving a WARC protected frequency of 1420 MHz may be used for fire, temperature speed detection and intrusion detection. One or more receiver arrays can be used to provide a plurality of frequency ranges that can be detected. In an interior installation, one or more receiver arrays can be placed inside a wall made of non-metallic substance and capable of passively receiving frequencies at less than 3 GHz. In other embodiments, the receiver and array can be in the form of a hand-held or wearable device. This method and apparatus achieves high performance by exploiting conventional low noise amplification block conversion circuits and provides the detection of thermal signals through clear, smoky, misty, or environmentally untenable conditions as well as the detection of automobiles and intruders via black box emission. A passive microwave detector may be used at a highway where the highway intersects an associated antenna lobe for a distance, mounted on a wall or pole and have line-of-sight view of an intruder or automobile.

18 Claims, 25 Drawing Sheets

Detector Array of Microwave Receivers
and Antennas Surrounding a Protected Boundary

U.S. PATENT DOCUMENTS

| | | | |
|---|---|---|---|
| 5,302,024 | A | 4/1994 | Blum |
| 5,370,458 | A | 12/1994 | Goff |
| 5,526,676 | A | 6/1996 | Solheim et al. |
| 5,576,972 | A | 11/1996 | Harrison |
| 5,578,988 | A | 11/1996 | Hoseit et al. |
| 5,677,988 | A | 10/1997 | Takami et al. |
| 5,688,050 | A | 11/1997 | Sterzer et al. |
| 5,724,666 | A | 3/1998 | Dent |
| 5,785,426 | A | 7/1998 | Woskov et al. |
| 5,793,288 | A | 8/1998 | Peterson et al. |
| 5,796,353 | A | 8/1998 | Whitehead |
| 6,188,318 | B1 | 2/2001 | Katz et al. |
| 6,384,414 | B1 | 5/2002 | Fisher et al. |
| 6,543,933 | B2 | 4/2003 | Stergiopoulos et al. |
| 6,724,467 | B1 | 4/2004 | Billmers et al. |
| 6,729,756 | B2 | 5/2004 | Sezai |
| 6,767,129 | B2 | 7/2004 | Lee et al. |
| 6,773,159 | B2 | 8/2004 | Kim et al. |
| 6,900,756 | B2 | 5/2005 | Salmon |
| 6,932,776 | B2 | 8/2005 | Carr |
| 7,052,176 | B2 | 5/2006 | Stephan et al. |
| 7,121,719 | B2 | 10/2006 | Lee et al. |
| 7,197,356 | B2 | 3/2007 | Carr |
| 2008/0251733 | A1 | 10/2008 | Anderton |
| 2009/0284405 | A1 | 11/2009 | Salmon et al. |

FOREIGN PATENT DOCUMENTS

| | | |
|---|---|---|
| WO | 9714941 | 4/1997 |

OTHER PUBLICATIONS

Kaiser, Thomas et al.; Is Microwave Radiation Useful for Fire Detection?, 12th International Conference on Fire Detection, 2001, NIST, Gaithersburg, MD, pp. 1-16.

Ruser, H. et al., Fire Detection with a Combined Ultrasonic-Microwave Doppler Sensor, 1998 IEEE Ultrasonics Symposium, pp. 489-492.

Grosshandler, William L., NISTIR 5555, A Review of Measurements and Candidate Signatures for Early Fire Detectio, Jan. 1995.

Thuillard, M., A New Flame Detector Using the Latest Research on Flames and Fuzzy-Wavelet Algorithms, Fire Safety Journal 37, 2002, Elsevier, pp. 371-380.

Kempka, Thorsten, Microwaves in Fire Detection, Fire Safety Journal 41, 2006, Elsevier, pp. 327-333.

PASSIVE MICROWAVE SPEED AND INTRUSION DETECTION SYSTEM

CROSS-REFERENCE

This application is a continuation-in-part of U.S. application Ser. No. 12/336,822 filed Dec. 17, 2008 which is a continuation-in-part of U.S. application Ser. No. 11/931,399 filed Oct. 31, 2007, (now U.S. Pat. No. 7,724,134), which claims priority to provisional U.S. Application Ser. No. 60/944,217, filed Jun. 15, 2007, the disclosures of which are incorporated by reference into the present application in their entirety.

TECHNICAL FIELD

Aspects described herein relate to a fire, speed and intrusion detection system using passive microwave radio reception.

BACKGROUND

Temperature, speed and intrusion detection are important for a myriad of reasons. Fire can cause serious damage to property and persons and can even result in loss of life to persons or animals caught in a fire. Additional damage beyond that caused by flames can be caused by smoke or soot or by water used to fight the fire. Such damage can result in significant financial losses—or worse—to the victims of a fire.

Intruders, whether human or animal, also can cause damage to persons or property, and so it may be desirable to detect and locate such intruders to avoid any problems resulting from their presence. An intruder, for example, may be a living being or an automobile. In addition, in the case of a fire, it can be very important to know whether there are any persons in a burning location and where they are so that fire fighters either can locate and rescue such persons or, if no one is present, do not need to take unnecessary risks to rescue persons who are not present.

Intrusion detection typically involves the active emission of electromagnetic or sound waves and detecting their reflection from the intruder. Ultrasonic intrusion systems are described in, for example, U.S. Pat. No. 3,986,183 to Fujiwara and many others. Intrusion detection systems in which a microwave frequency is transmitted and an intruder detected due to reflections of the radiated energy are detected on a frequency range of from 0.5 GHz to 30 GHz. A passive detector detects radiation of a heat source in the frequency ranges of 0.5 to 30 GHz, preferably 2 to 20 GHz. The disclosed system also may comprise a plurality of antennae units, each antennae unit being designed for a particular, different frequency described in, for example, U.S. Pat. No. 5,576,972 to Harrison; U.S. Pat. No. 5,578,988 to Hoseit et al.; U.S. Pat. No. 5,793,288 to Peterson et al.; U.S. Pat. No. 5,796,353 to Whitehead; U.S. Pat. No. 6,188,318 to Katz et al.; and U.S. Pat. No. 6,384,414 to Fisher et al. The systems described in these patents all require an active emission of microwave radiation from a source, which is reflected by the object (e.g., an intruder) to be detected. For example, as described in the Harrison '972 patent, known objects or living entities may provide baseline signatures against which the reflected radiation can be measured. Movement of an intruder can be detected by use of the Doppler effect, i.e., by measuring a change in the reflected radiation as an object moves towards or away from the source of the radiation. In addition, Fisher et al. describes a plurality of passive thermal radiation sensors adapted to transmit a plurality of sensor signals. The apparatus also includes a distance sensor such that the apparatus can collectively reduce false alarm rates of intruder detection.

EP 1 944 591 A1 describes a method and device for detecting a heat source through a wall or other obstacle. Thus, the invention does not require direct contact between a heat source and a passive antenna operating in a radiation frequency band.

WO 97/14941 (PCT/CA96/00686) describes a method for remotely determining internal temperatures through materials by microwave radiation. In particular, the method comprises selecting a frequency range where microwave radiation at least partially penetrates the materials, detecting self-emitted thermal radiation through the materials for the microwave frequency range in a target beam of a passive receiver, producing signals proportional to the thermal radiation detected in the target beam, remotely scanning the target beam of the passive receiver through a target pattern, comparing the signals for different locations in the target pattern to identify locations emitting higher thermal radiation, and processing the signal to provide an indication of internal temperature for the locations emitting higher thermal radiations. The method is useful for search and rescue missions, natural disaster prevention and early detection. The preferred frequency range is 0.5 to 40 GHz.

FR 2627865 describes a radiometer measurement device that includes an antenna for capturing thermal noise captured by a target. In particular, the radiometer is useful in preventing fires wherein the smoke is thick. The radiometer takes microwave radiation measurements in the band of 34 to 36 GHz.

DE 3147775 A1 describes a method for fire detection using a flame detector to monitor microwave radiation.

Referring to FIG. 19, there is shown a plot of a human body, candle flame, Bunsen burner and sun radiation as a black body. As will be further discussed herein, a black body radiates frequencies in the microwave range including a fire, an automobile and a human body. The depicted graph tends to show relative spectral emission as peaking for a human body in the infrared range at $10^4$ nanometers in wavelength and frequency. The graph also shows that black body radiance from either a flame or a human body follows a straight line decline with increasing wavelength and decreasing frequency into the microwave band from the infrared. The graph is extrapolated from FIG. 2.1 of *Three-Dimensional Reconstruction of Fire From Images*, by S. W. Hasinoff, a thesis prepared for the University of Toronto, Department of Computer Science, 2002. Humans exhibit primarily black body emission. As the graph demonstrates, various fires exhibit black body radiation as well at approximately the same frequency. Moreover, as will be discussed further herein, fire also results in free radical spectral emission at specific frequencies.

Referring to FIG. 20, there is shown attenuation of microwave signals of 0.5 to 2.5 GHz measured through various wall materials: drywall, brick, block, adobe and cement taken from FIG. 5 of *Image formation through walls using a distributed radar sensor network*, by Allan R. Hunt, of AKLELA, Inc., Santa Barbara, Calif., 2005, available from the AKLELA web site. As illustrated from the plot, drywall has a magnitude of −5 dB at 2,000 MHz. Alternatively, concrete has a magnitude of −25 dB at 2,000 MHz. Therefore, the attenuation of microwave signals through drywall is 5 times greater than through concrete.

U.S. Pat. No. 6,724,467 to Billmers et al., describes a system and method for viewing objects at a fire scene by discriminating reflections from an object from smoke and fire. Some limited tests also have utilized acoustic sensors for fire detection.

Such techniques, however, are not infallible and frequently result in false alarms. For example, a thermal sensor in the proximity of a bathroom shower may detect rising air temperature from a hot shower and trigger an unnecessary alarm. In addition, since such thermal detectors do not detect smoke, they can be slower to react to detect a fire than are smoke detectors.

Consequently, thermal sensors are often used in combination with smoke detectors which operate upon the detection of particulate matter from smoke in the air. Particle and smoke detectors use photoelectric, ionization, carbon monoxide, gas-sensing, and photo beam technologies to sense byproducts of combustion. However, these devices also are not infallible, and may falsely trigger from, for example, cigarette or cigar smoke. Moreover, one or both of the thermal and smoke detectors may be slow to react to a growing fire, thus leading to greater risk to property or life. In addition, the presence of smoke can complicate the detection of fires. Studies show that 90% of wood smoke particles are smaller than 1 micron in size. Particles from oil smoke are in the 0.03 to 1 micron range, while particles from cooking smoke from grease are in the 0.01 to 1 micron size, as is tobacco smoke. Consequently, discrimination among types of smoke is difficult, which requires sophisticated pattern recognition algorithms and detector sensors to reduce the nuisance sensitivity (see L. A. Cestari, et al., "Advanced Fire Detection Algorithms using Data from the Home Smoke Detector Projects," Fire Safety Journal, 40 (2005), 1-28).

Microwave engineering technologies also have been considered as a means to detect flaming and smoldering fires, particularly when using multi-spectral electromagnetic wave sensing. The premise is that the fire's radiant heat transfer components generate a detectable signal in the microwave portion of the electromagnetic spectrum.

Electromagnetic waves are created when charged particles such as electrons change their speed or direction. These electromagnetic waves consist of an electric field and a magnetic field perpendicular to the electric field. The oscillations of these fields are reflected in the frequency and wavelength of the electromagnetic wave. The frequency is the number of waves (or cycles) per second. The energy of these waves may also be characterized in terms of the energy of photons, massless particles of energy traveling at the speed of light that may be emitted at certain discrete energy levels. The following mathematical relationship demonstrates a relationship among the wavelength of an electromagnetic wave, its frequency, and its energy:

$$\lambda = \frac{c}{f} = \frac{hc}{E}$$

where
$\lambda$=wavelength (meters)
c=speed of light ($3\times10^8$ meters per second)
f=frequency (Hertz)
h=Planck's constant ($6.63\times10^{-27}$ ergs per second)
E=energy of the electromagnetic wave (ergs)

Wavelength and frequency are the inverse of one another as related by the speed of light, and may be used interchangeably herein in the description of embodiments and the claims as equivalents of one another. Note that the energy of an electromagnetic wave is proportional to the frequency and is inversely proportional to the wavelength. Therefore, the higher the energy of the electromagnetic wave, the higher the frequency, and the shorter the wavelength.

The term "microwave" generally is used to refer to waves having frequencies between 300 Megahertz (MHz) (wavelength=1 m) and 300 Gigahertz (GHz) (wavelength=1 mm). Microwave radiation is highly directional, and the higher the frequency, the more directional the emitted radiation. For the purposes of the present application and claims, an emission above 300 GHz up to 1000 GHz will also be considered within the microwave band.

The radiation from electromagnetic waves can be emitted by thermal and non-thermal means, depending upon the effect of the temperature of the object emitting the energy. Non-thermal emission of radiation in general does not depend on the emitting object's temperature. The majority of the research into non-thermal emission concerns the acceleration of charged particles, most commonly electrons, within magnetic fields, a process referred to in the astrophysics field as synchrotron emission. For example, astrophysicists and radio astronomers look for synchrotron emissions from distant stars, supernovas, and molecular clouds.

On the other hand, thermal emission of radiation from electromagnetic waves depends only upon the temperature of the object emitting the radiation. Raising the temperature of an object causes atoms and molecules to move and collide at increasing speeds, thus increasing their accelerations. The acceleration of charged particles emits electromagnetic radiation which forms peaks within the wavelength spectrum. There may be a direct correlation in changes in temperature impacting the accelerations of the composite particles of an object with the frequency of the radiation and peaks within the spectrum. Once an object reaches its equilibrium temperature, it re-radiates energy at characteristic spectrum peaks.

Common forms of this radiation include blackbody radiation, free-free emission, and spectral line emission. A blackbody is a theoretical object that completely absorbs all of the radiation falling upon it and does not reflect any of the radiation. Thus, any radiation coming from a blackbody is from its inherent radiation and is not the result of any radiation incident upon it. Blackbody radiation is a basic form of thermal emission of electromagnetic radiation from an object whose temperature is above absolute zero (0 Kelvin). Practical examples of blackbody radiators include a human body, an automobile, a Bunsen burner, a candle flame, the sun and other stars in the galaxy.

Passive high-gain directional microwave antennas and receivers have been used to measure the temperature of a remote object in the technical field commonly known as microwave radiometry. Typical users of microwave radiometry are radio astronomers scanning extraterrestrial objects and the earth. A microwave radiometer known from the field of the astronomy sciences pointed at the sky can produce a measurable voltage output which is proportional to the temperature of the target. For example, the science of detecting the temperatures of planets is an established technology in the field of radio astronomy, and radio astronomers can use microwave apparatus to measure the temperatures of distant planets and stars. Orbiting satellites pointed back towards the earth may also use microwave apparatus to conduct remote sensing of regions of the earth's surface, for example, to detect volcanic activity or to take temperature readings generally.

Radio astronomy operates in internationally allocated bands of frequencies for research purposes according to the 1979 International Telecommunication Union's World Administrative Radio Conference, also known as "WARC- 79," (J. Cohen, et al., *CRAF Handbook for Astronomy, Committee on Radio Astronomy Frequencies*, European Science Foundation, 3d Ed. (2005)). These bands are free of microwave active transmission and so are relatively free of noise when used for passive detection for example, from the stars or planets. Use of passive microwave frequencies at these internationally protected frequencies within the microwave radiation spectra may guarantee that reception is free of interference from active microwave radiation.

Some of the WARC-79 allocated bands are reserved as "PRIMARY exclusive." These PRIMARY exclusive bands include 21.850 to 21.870 MHz, providing a 20 KHz wide band; 1.400 to 1.427 GHz, providing a 27 MHz band; 2.690 to 2.700 GHz, providing a 10 MHz band, 10.680 to 10.700 GHz, providing a 20 MHz band; 15.350 to 15.400 GHz, providing a 50 MHz band; 23.600 to 24,000 GHz, providing a 400 MHz band; 31.3 to 31.5 GHz, providing a 200 MHz band; 50.2 to 50.4 GHz providing a 200 MHz band, 86.0 to 92.0 GHz providing a 6 GHz band; 100.0 to 102.0 providing a 2 GHz band, 114.25 GHz to 116 GHz providing a 1.75 GHz band and 116.00 to 119.98 GHz providing a 3.98 GHz band. The 1.400 to 1.427 GHz band includes the spectral hydrogen line which is very important for radio astronomy purposes. In addition, some bands are labeled as "PRIMARY exclusive" but are restricted according to region of the Earth's surface.

Other frequencies also are set aside and require "Notification of Use" when someone wishes to transmit on these frequencies. These frequencies include 4.950 to 4.990 GHz, providing a 40 MHz band. The 1.6 to 1.7 GHz band is utilized for missile tracking radar but the chances of interference in a passive fire detection system would be low. Still other frequencies are "PRIMARY shared with active." The entire band of frequencies between 275 GHz and 1000 GHz require "notification of use" but are otherwise unused for any purposes.

In any of these frequency bands, active microwave frequencies present in a passively received signal may be known to a passive receiver so that the active frequency can be distinguished and ignored. For example, 1.400 to 1.427 GHz provides a protected bandwidth of 27 MHz. The wavelength of 21 cm, corresponds to a hydrogen line radical. A wider band than 27 MHZ may be received at an antenna and block converted in the field of astronomy. Alternatively, the output can be narrowed by a bandpass filter. Also conventional low noise amplifiers may pass a band of interest and provide gain as will be further discussed herein. In addition, passive microwave reception at this frequency range may be combined with reception of microwave radiation at other microwave frequencies outside this range. Moreover, other microwave frequencies including or overlapping the internationally protected bands may be detected over wider bandwidths such as 100 MHz to several hundred GHz.

Range resolution is fundamentally limited by the bandwidth of the transmitted frequency. The change in range resolution, $\Delta R$, is defined by the equation, $c/2*BW$, wherein c is the speed of light ($\sim 3*10^8$ meter/second) and BW is the bandwidth. Thus, the wider the bandwidth, the better the range resolution. For instance, at 1,500 MHz bandwidth, the range resolution is 0.1 m.

On a similar note, cross range resolution is determined by frequency and the aperture size of the antennae. At longer distances, larger antennas and/or higher frequencies are necessary to maintain the range resolution. For instance, at a frequency of 1 GHz, the range resolution decreases with an increasing detection range and decreasing antenna array aperture size.

Improved devices for microwave detection include, for example, use of metal-semiconductor field effect transistors (MESFETs) for low noise block converters. Such microwave detection devices are described in several United States patents, including U.S. Pat. No. 7,052,176 to Stephan et al.; U.S. Pat. No. 5,302,024 to Blum; U.S. Pat. No. 5,370,458 to Goff; and U.S. Pat. No. 6,767,129 to Lee et al. Devices for microwave detection are presently less expensive when detecting radiation in a range of microwave frequencies less than 25 GHz; however, improvements in microwave detection circuitry to practical application at higher frequencies up to the infrared region should not be taken to limit embodiments described herein.

Other technical fields using detection of electromagnetic radiation in the microwave frequency range include the technical field of cellular telecommunications. Typical cellular frequencies include 800 MHz and 1.8 GHz. Intermediate frequency may be at 70 or 140 MHz. In the cellular telecommunications field, it is conventional to provide an antenna pole or mount on a building or other fixed structure having some height. For example, FIG. 8 of U.S. Pat. No. 5,724,666 to Dent shows a plurality of antenna arrays 210, 212, each having respective amplifiers 216, wherein each array appears as a plurality of directional elements 224 which may be used for transmitting and receiving.

The use of passive microwave detection in the field of radio astronomy is described in several U.S. patents, including U.S. Pat. No. 4,499,470 to Stacey; U.S. Pat. No. 4,645,358 to Blume; U.S. Pat. No. 5,526,676 to Solheim et al.; and U.S. Pat. No. 6,729,756 to Sezai. The '470 patent to Stacey describes a satellite over the oceans of the Earth, their mapping as the satellite passes between land and water and monitoring of the temperature of the ocean below. The '358 patent to Blume describes a problem in the radio astronomy field that measurement of the Earth's surface properties and those of the universe can be very inaccurate, especially in cases of low contrast with the background and describes a Raleigh-Jeans approximation procedure for overcoming such problems. The '676 patent to Solheim et al. describes principles of microwave radiometry especially applicable to detection of water vapor and cloud masses using frequencies, for example, at 50-70 GHz, 19-29 GHz and 40-80 GHz. The '756 patent to Sezai discusses use of a deep space reference temperature of 2.7° Kelvin as well as a hot calibration source.

The principles of radio astronomy also have been applied to measuring energy inside a human body. Such use can be seen in, for example, U.S. Pat. No. 4,416,552 to Hessemer, Jr. et al.; U.S. Pat. No. 4,532,932 to Batty, Jr. (tumor cells); U.S. Pat. No. 4,583,869 to Chive et al. (use of two probes); U.S. Pat. No. 4,605,012 to Ringeisen et al. (hyperthermia); U.S. Pat. No. 5,677,988 to Takami et al. (internal temperature of human body); U.S. Pat. Nos. 4,715,727 and 6,932,776 to Carr (heating at 915 MHz and measuring at 4.7 GHz); U.S. Pat. No. 4,798,209 to Klingenbeck et al. (diseased human tissue); U.S. Pat. Nos. 5,176,146 to Chive and 5,688,050 to Sterzer et al. (mammography); U.S. Pat. No. 6,543,933 to Stergiopoulos et al. (the skull); and U.S. Pat. No. 6,773,159 to Kim et al., U.S. Pat. No. 7,121,719 to Lee et al. and U.S. Pat. No. 7,197,356 to Carr (microwave catheter).

Microwave engineering technologies have also been investigated for use in detecting flaming and smoldering fires. In research by the inventors, fire has been demonstrated to actually be "plasma," a phenomenon often referred to as the fourth state of matter. Plasma is an ionized gas that consists of a mixture of electrons (negatively charged particles) and ions (atoms that have lost electrons, resulting in a positive electric charge). Fire can be easily classified as plasma, because it often behaves like a gas, can conduct electricity, and is affected by magnetic fields. Common examples of a plasma fires range from the Sun to the arc formed during electric arc welding, both of which can offer a broad electromagnetic spectrum of radio interference.

Detection of fires by microwave engineering techniques relies upon the fact that thermal radiation from fires generates a detectable signal in the microwave portion of the electromagnetic spectrum which, like the microwave radiometer, can create a measurable change in voltage output which is proportional to a temperature.

For example, one use of microwave technologies in the field of fire detection appears in a 1995 National Institute of Standards and Technology (NIST) report by Grosshandler entitled, "A Review of Measurements and Candidate Signatures for Early Fire Detection," NISTIR 5555, January, 1995 at pp. 13-14. The NIST report suggests that the concept of multi-spectral electromagnetic wave sensing may be applicable to fire detection. The report cites a "modified microwave motion detector . . . for monitoring the presence of a flame within a multi-burner natural gas furnace," citing Berman et al. (1992). (C. H. Bermann et al., "Microwave Backscattering Fuel/Air Ratio Control and Flame Monitoring Device," *Fossil Fuel Consumption*, American Society of Mechanical Engineers, Vol. 39, Book G00645, 1992). Moreover, FIG. 2 provides data for fire temperature versus existence of fire products at various temperature ranges. In particular, $CO_2$, $H_2O$, $SO_2$ and HCl dominate across the entire temperature range of a typical fire. Of these, $H_2O$ vapour emits microwave at 22.235 GHz, 183.31 GHz, 547.676 GHz and 556.936 GHz. HCl emits a spectral line at 625.040 and 625.980 GHz respectively according to the *CRAF Handbook for Radio Astronomy*, 2005, pp. 90-92. Carbon monoxide, $H_2$, and NO are formed in moderate levels for fire temperatures of about 1500° K. CO emits at 109.782, 110.201, 112.359 115.271, 219.560, 220.399, 230.538, 345.796, 439.088, 461.041 and 576.268 GHz among other spectral frequencies. Nitric oxide (NO) has a spectral line at 150.4 GHz. Similarly, the free radicals H, O, OH (hydroxyl), Cl and SO appear at these high fire temperatures. The OH radical appears at frequencies of 1.612231, 1.665402, 1.667359 and 1.720530 GHZ and, as indicated above, provides narrow, tall spectral lines, useful for Doppler effect detection.

According to U.S. Pat. No. 5,785,426 to Woskov et al., a waveguide may be disposed within a furnace to direct radiation through a window to a heterodyne receiver disposed outside the furnace; this radiation can be used to measure furnace temperatures where the microwave radiation is in the range of 130-140 GHz and converted to 0.4-1.5 GHz for detection. U.S. Pat. No. 5,829,877 to Baath describes utilizing microwave energy and, as shown in FIG. 5 of Baath, describes detecting certain relevant peaks, for example, $SO_2$, $NO_2$, $H_2O$, and $NH_3$, among other compounds known as products of combustion.

Another use of microwave technology can be used to detect moving objects travelling at relatively fast or slow velocities which emit heat. Early detection can be used as a cautionary measure to ward off unnecessary disasters. Some examples include burglaries, catastrophic events and fires.

A German 2001 NIST paper suggests that Daimler Chrysler Aerospace AG conducted earlier experiments in the detection using microwave energy (T. Kaiser et al., "Is Microwave Radiation Useful for Fire Detection?" *Proceedings of the 12th International Conference on Automatic Fire Detection*, AUBE '01, Volume 965, Mar. 26-28, 2001, Gaithersburg, Md., NIST Special Publication). The purpose of these experiments, which is not further explained, was to detect fires in garbage bunkers. The possibility of using microwave engineering technologies in passive fire detection is also described in the NIST Conference paper in 2001 by Kaiser et al. which further describes the use of microwaves to passively detect a fire using a conventional Dicke switch operated at 1 KHz to compare a reference temperature of a room wall with measurements at 11 GHz in the microwave region and a bandwidth of 1 GHz. (See R. H. Dicke, "The measurement of thermal radiation at microwave frequencies," *Rev. Scl. Instr*. Vol. 17, pp. 268-275, 1946). The discussed technique relies upon thermal radiation from fires generating a detectable signal in the microwave portion of the electromagnetic spectrum. To do so, Kaiser et al. further suggest use of a commercial satellite dish and a superheterodyne low noise converter to measure the microwave radiation of a target test fire.

Follow-up tests are described by Kempka et al. in 2006, and expand the frequency range of the initial Kaiser et al. experiments from 2 to 40 GHz (T. Kempka et al., "Microwaves in Fire Detection," *Fire Safety Journal*, Volume 41, 2006, pp. 327-333). According to this 2006 publication, thermal radiation may be measurable utilizing four broadband antennas to cover four separate frequency bands of operation, i.e., 2-12, 12-18, 18-26, and 26-40 GHz bands of operation and respective bandwidths at 100 MHz each. "For each configuration one sample will be measured in the first frequency band. Then the receiver changes to the next frequency band and takes another sample. After all the selected frequency bands are measured, the receiver will measure the first band again." Kaiser et al. further suggest using a "hot load" having a temperature of 100° C. (373 K) to calibrate their apparatus at a reference temperature. Certain fires were detected 90 seconds after ignition while another type of fire was detected 80 seconds after a heater was switched on. The time difference between samples was about 3.5 seconds.

All United States and foreign patents and articles whose citations are provided above should be deemed to be incorporated by reference as to their entire contents for the purposes of understanding the underlying technology behind a passive microwave fire and intrusion detection system.

SUMMARY

This summary is intended to introduce, in simplified form, a selection of concepts that are further described in the Detailed Description. This summary is not intended to identify key or essential features of the claimed subject matter, nor is it intended to be used as an aid in determining the scope of the claimed subject matter.

Embodiments of a low-cost passive microwave receiver and associated arrays in accordance with aspects and features described herein can permit the efficient monitoring, detection, and reporting of fire, and detect temperature and speed and sources of other thermal signatures introduced within a surveillance area or field of view. In other embodiments, a passive microwave receiver can be used to recognize humans or other animals and distinguish them from automobiles present in an area, and thus can be used, for example, as an intrusion detection device based primarily on black body spectrum emission measurement and comparison with predicted data (for example, per FIG. 19) which may be utilized as a look-up table for frequency or wavelength versus expected microwave black body emission level. An associated temperature, speed and/or intrusion detection method such as is described herein is passive in nature. Potentially harmful-to-human and noisy microwave radiation emission may be eliminated, with no damage to structures or living organisms as may occur from an active microwave radiation system and method.

A passive microwave radiation receiver in accordance with aspects described herein may comprise a fixed or moveable array of antennae and low noise receivers mounted in a surveillance grid for an enclosed space or an open area. The fixed array of receivers may comprise directional antennae operating at fixed frequencies over a bandwidth of frequencies, for example, a bandwidth that is protected internationally for passive microwave reception. In another embodiment, a passive microwave temperature, speed and/or human or automobile intrusion detection apparatus may comprise a unit which may be worn or carried by a person or mounted to a vehicle. A plurality of such passive microwave devices may protect a space such as a building or a parking lot and may monitor for intrusion at openings such as doors and windows. All such devices may be connected to a central computer processing system including memory and a display. The memory may store known black body emission characteristics for, for example, humans and automobiles as well as expected microwave spectral line emission data for fire (for example, HCl, OH and H) as well as Doppler effect intruder and fire characteristics and shedding frequency fire characteristics. Moreover, a single reference detector may be used to provide a reference ambient temperature for operation, for example, one mounted in a floor/ceiling/wall requiring no power to produce a reference temperature. A passive microwave fire and intrusion detection method and system may achieve a high performance including a low level of false alarms by recognizing known anomalies and exploiting the natural detection of thermal signals through clear, smoky, or misty conditions. Moreover, embodiments using improved passive radiometer circuits and processes can improve the detection of fire to a matter of seconds from ignition.

Various embodiments in accordance with aspects described herein can provide a wide range of fire, intrusion, speed detection and security applications, including but not limited to fire detection, proximity and intrusion detection, surveillance, infrastructure protection, vehicle speed detection and security investigations. Passive microwave detectors in accordance with one or more aspects herein could also assist fire investigators to identify and confirm multiple sources of ignition during full-scale fire tests, particularly during the generation of optically dense smoke and flames. The intrusion and speed detection aspects herein can also assist fire investigators and first responders to identify and locate the presence of persons or other living beings needing rescue in a fire. In addition, the intrusion detection aspects herein can be used for general security and monitoring purposes as well.

Significant new tests conducted by the inventors at 1420 MHz have expanded the initial reported results, have demonstrated methods to reduce interference by use of selected frequencies and isolation of spurious electromagnetic noise, and have introduced new concepts beyond fire detection to speed detection, intrusion and security alerting. There are a broad range of examples that demonstrate a long-felt need where microwave speed and human or automobile intrusion technologies can play an important role, particularly when such a system is fully automated.

The military also could use passive microwave fire and intrusion technologies in their support and security efforts, for example, to monitor and protect battlefields, bridges, harbors, borders, international crossing points, and other critical infrastructures. Another benefit of these technologies is that they can passively detect aircraft coming over the horizon at any altitude or automobiles traveling on highways.

In addition, domestic farming activities could benefit from passive microwave fire and intrusion detection. Since the technique is also sensitive to body temperatures within the field of view of the receiving antennae, the tracking and corralling of livestock such as cattle over ranges, entering corrals, and even wandering outside boundaries could be beneficial, particularly for those in the milking industry. This technology could also determine thermal signatures of livestock, humans, or predators so that such animals can be monitored and undesired intruders identified.

Microwave fire and intrusion detection capabilities can also be used to detect the movement and speed of vehicles along roads and tunnels and shipboard movements along channels. Signature analysis could identity the traffic flow and thermal signatures differentiating between cars, trucks, motorcycles, and other vessels. This technique could also identify stalled vehicles or those catching fire particularly in high density underground tunnels.

As will be explained further herein, a 1420 MHz passive microwave receiver has been designed, built and tested. The receiver has been utilized with a parabolic antenna for automobile speed detection. The antenna and passive receiver were set up facing a suburban street. An automobile passed through the antenna range and exhibited a sharp peak upon doing so. The parabolic antenna reception lobe can be measured in the street vicinity, for example, at fifty feet. The length of time the automobile is within the beam comprises a measurable pulse width (or duration) of approximately three seconds. The pulse height is an indicator of the temperature of the motor and other heat releasing components of the automobile such as the exhaust system. Consequently, speed of the automobile may be detected by a calculation of time and beam lobe range in feet in the vicinity of the street on which the automobile is driving. Such a process eliminates the need for Doppler effect transmission and reception for a speed detector. Moreover, the car's temperature signature signal in voltage pulse length and shape can be compared with known temperature signals of similar make and model automobiles to determine automobile identity. The same passive receiver was utilized to measure another automobile traveling at a lesser rate of speed through the beam and then again at a slow rate of speed, for example, five miles per hour through the beam. Finally, a human being walked within the beam path at approximately fifty feet and was detected for a time period of approximately fifty seconds. The same human being crossed the beam path twice close to the receiver and was detected twice. All signals exhibit the same approximate signal strength, indicative of a constant temperature of the human body. Speed of the human within the beam path may be calculated in a similar manner as the automobile.

These and other uses can be made of a passive microwave speed, temperature and intrusion detection method and apparatus in accordance with aspects and features discussed below.

BRIEF DESCRIPTION OF THE DRAWINGS

in FIG. 21(B) an exemplary embodiment is provided which may take an entire captured pass band of black body emission of a demultiplexed passive microwave channel and detect at frequency increments of, for example, 3 MHz for continuous attenuation across the entire band as predicted by, for example, FIG. 19.

DETAILED DESCRIPTION

The aspects summarized above can be embodied in various forms. The following description shows, by way of illustration, combinations and configurations in which the aspects can be practiced. It is understood that the described aspects and/or embodiments are merely examples. It is also understood that one skilled in the art may utilize other aspects and/or embodiments or make structural and functional modifications without departing from the scope of the present disclosure.

As described above, it is known that temperature of an object emits a wide spectrum of electromagnetic radiation. Such radiation includes not only infrared (heat) radiation, but also includes microwave radiation in the range of 300 MHz to 1000 GHz and at corresponding wavelengths of from 1 meter to less than 1 mm, due to radiated energy typically from black body emission. Such microwave radiation can be detected without the need for any corresponding emission of microwave radiation by an antenna. Instead, in accordance with aspects and features described herein, the emitted energy of a human being or an automobile in the microwave regions of the electromagnetic spectrum can be detected using passive microwave detection by one or more antennae.

In addition, living bodies such as persons or animals emit microwave radiation due to their inherent thermal energy via black body emission. This radiation also can be detected by the same antenna used to detect the microwave radiation from an automobile.

Thus, a passive microwave detection method in accordance with aspects described herein can rely upon the fact that thermal radiation from automobiles, persons, or other moving or stationary bodies can generate a detectable signal in the microwave portion of the electromagnetic spectrum.

Embodiments described herein can use characteristics of microwave radiation at various frequencies in a method and system for speed, temperature and intrusion detection. Because of the high frequency/short wavelength nature of microwaves, microwave radiation can penetrate optically thick smoke and water vapor, as molecules suspended in the air such as oxygen, water vapor, dust, and smoke do not attenuate the microwave radiation emanating from an object, whether the source of the radiation is thermal such as the thermal output of an automobile engine and related components or an intruder or other object.

Using well-known principles regarding directionally diverse antennae, a passive microwave detection system in accordance with aspects herein can permit an automobile or an intruder to be more quickly located, pinpointed and its movement tracked and speed detected.

In addition, due to its relatively long wavelength, microwave radiation can penetrate non-metallic walls, and can thus be used to detect an automobile or an intruder within such a non-metallic structure.

Figure 1:
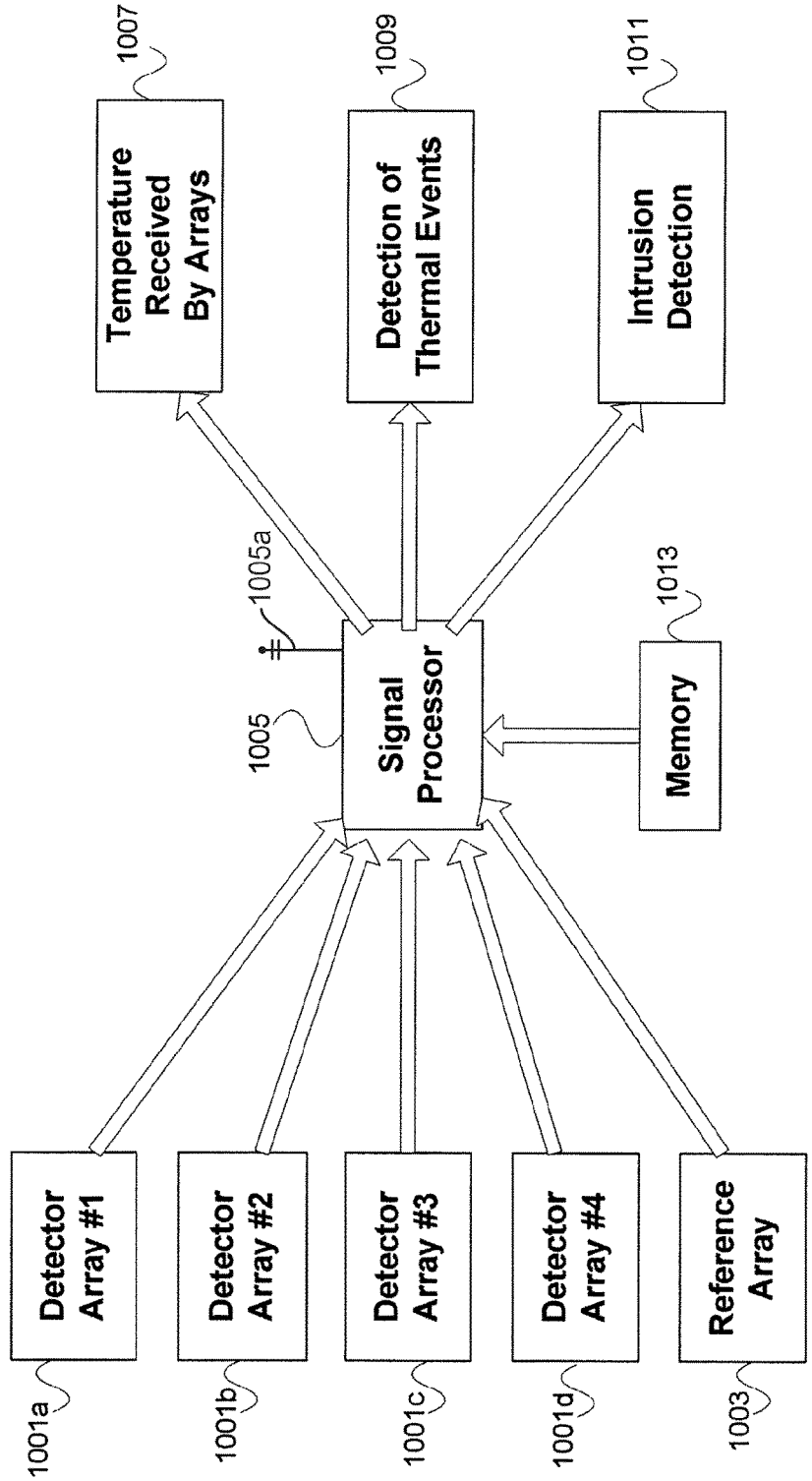
FIG. 1 is a block diagram of an integrated passive fire and intrusion detection system according to one or more aspects described herein.

FIG. 1 is a block diagram of one embodiment of an exemplary microwave temperature and intrusion detection system according to one or more aspects described in more detail herein. As shown in FIG. 1, a microwave temperature and intrusion detection system can include a plurality of detector arrays, such as detector arrays 1001a through 1001d in the exemplary embodiment shown in FIG. 1, plus reference array 1003. As discussed in more detail herein, detector arrays 1001a-1001d are configured to detect radiation in one or more frequency bands in the microwave range, such as black body radiation emanating from an automobile or an intruder. Reference array 1003 is configured to detect radiation from a baseline radiation source such as the ground or a constant temperature hot source. Each detector in array 1001a-1001d can detect a unique temperature reading indicated by a relative voltage level output at a given microwave frequency or band of frequencies or be otherwise indicative of temperature based on passively received microwave radiation, where each detector may operate at a different wavelength or frequency or frequency range so as to capture black body or spectral line emission and a speed calculation may result from duration of a body within a passive antenna receiving lobe. Each array can report this unique temperature reading in the form of a voltage signal that may be sampled by analog to digital conversion as may be the received frequency value and is in turn output to a central processing unit comprising a signal processor 1005 and memory 1013 as shown in FIG. 1 (described in more detail below with respect to FIGS. 7 and 8). One exemplary digital signal processor for acting on digitally sampled frequency and level measurements is the Motorola DSP56800 which may provide a Doppler input to a more sophisticated data processing apparatus such as a personal or mainframe computer. The voltage signal level at a given frequency or frequency range reported by each detector to signal processor 1005 can be directly or indirectly proportional to the temperature measured by the detector. Moreover, a spectral line indicator such as the presence of a given measurement of a given radical such as hydrogen or the hydroxyl radical may be an indicator of a very high temperature. In an alternative embodiment, active microwave signals used in a geographic region for, for example, telecommunications, satellite television, or military purposes, may be detected, stored in memory 1013 as a signature, and subtracted as noise from any signals processed by signal processor 1005.

Signal processor 1005 can be in the same or a different location as the antenna arrays, and the signals from each array to signal processor 1005 can be transmitted by wired or wireless means. An antenna 1005a is intended to represent receipt of wireless signals, for example received from a vehicle or human investigator to be discussed later with reference to FIG. 5 as well as from fixed or stationary detectors 1001a to 1001d. If transmission by wireless transmission, each such wirelessly transmitted signal from a passive microwave detector can also include a data signal uniquely indicative of the location and frequency or frequency range and bandwidth detected so that the signal can be appropriately identified and processed. For example, signal processor 1005 can be at a remote location such as a security station or other central monitoring station not affected by inclement environmental conditions such as those that may be present at a monitored facility, battlefield, hazardous waste dump, or other site.

Once the signals from detector arrays 1001a-1001d and reference array 1003 are processed, the results can be provided in a number of ways. According to aspects described herein and as discussed below the received microwave radiation can be converted into a signal wherein a voltage signal level can be determined as a result of the differences in radiation detected compared with a norm. In some embodiments, the radiation detected is compared to baseline radiation from, for example, a floor of a room, the ground, or the foliage of large trees, and a voltage difference can be used to detect the presence of an automobile or an intruder. For example, a negative voltage may be indicative of an automobile, its value an indication of its high temperature and its width an indication of its speed while a positive voltage may indicate the presence of a human body intruder. In other embodiments, the baseline radiation can be from an outdoor temperature, and detected radiation can be used to determine the presence or absence of a human or other living being in a space via black body radiation principles, thus, for example, aiding first responders in identifying the presence—or just as importantly, the absence—of persons in need of rescue.

In some embodiments, the difference in microwave frequencies detected by detector arrays 1001a-1001d and reference array 1003 can be output as a temperature detected by the detector arrays, either as an absolute temperature or as a temperature difference so that a thermal event, such as a passing automobile or intruder can be detected. Both automobiles and intruders have predictable black body emission, for example, per FIGS. 19 and 23-25. Also, the more black body emission at a given frequency. Alternatively, the difference in detected frequencies from predicted values can be output as a detection of an intruder and an appropriate alarm can be sounded. Moreover, a visual display may be associated with processor 1005 to provide a visual indication of a black body (automobile or intruder presence) or the output may take the form of a spectral line or frequency display of emission level versus frequency.

In other embodiments, the central processor 1005 can be connected to a remote or local display so that a visual display of an automobile or human intrusion can be shown, either alone or, for example, combined with an infrared or visible light display captured by an appropriate camera for storage or retrieval from memory 1013. Such a display output from a passive microwave receiver can show the location of both visible and less visible automobiles and intruders, for example, during a fog, rain or other weather condition. In addition, the intrusion and speed detection aspects, such a system can show the location of any persons or animals within a building, automobiles one a highway or in a parking lot trying to enter or leave a building or other protected space, thus enabling security personnel to better focus their efforts to deterring the intruder without risking their lives in unnecessary apprehension attempts.

As noted above and as described in more detail herein, aspects of a passive microwave fire and intrusion detection method and apparatus can incorporate the use of one or more passive microwave-based sensors including one or more antennas configured to receive microwave radiation in the microwave frequency range, including any of the several frequency ranges described above that are protected for passive microwave detection in the field of radio astronomy with detection occurring over the protected band or those bands such as above 275 GHz, not typically used for any radio communication or transmission. The present system may be used in conjunction with other known systems such as ionization, radiation (for example, in the visible or infrared or ultraviolet spectrum), ultrasonic and other known active radiation detectors. As such with greater information about a given event, potentially false alarms may be investigated thoroughly and eliminated as truly false.

In accordance with one or more aspects described herein, a passive microwave automobile and human intrusion and speed detection system and method can utilize the detection of microwave radiation on one or more of these protected frequencies by various combinations of microwave receivers and antenna arrays. An antenna array in accordance with one or more aspects herein can be designed to detect a subset of the microwave radiation band of from for example, a 27 MHz-wide band of 1.400 to 1.427 GHz (for hydrogen line spectral emission at 21 cm) and a 20 MHz wide band at a center frequency of 10.690 GHz to show an increasing black body emission with increasing frequency (decreasing wavelength). The principle may be extended to all frequencies across the microwave spectrum and into the infrared spectrums for black body radiation from an intruder in comparison with expected values as per FIG. 19. In addition, in accordance with aspects herein, this bandwidth can be split into many different internationally protected bands of varying bandwidth according to WARC-79 radio astronomy allocations, with each of a plurality of receivers receiving a subset of the emitted black body and spectral line passive microwave radiation. As other bands may be reserved in the future for passive detection, such frequencies and bands may also come within the scope of an embodiment. In addition, other bands in the microwave regions may be utilized, including bands which overlap internationally protected bands and known microwave radio frequencies in a given area subtracted or filtered from received results in a manner similar known from for example, echo cancellation techniques from the telecommunications arts.

Due to the mass production of commercial microwave antennas and associated electronics, the cost of passive microwave fire and intrusion detection is relatively low when compared to other technologies, such as infra-red thermal imaging. Low noise amplifier circuitry is now conventional and provides excellent low noise performance and permits discrimination from noise using antennae that are not high gain or large in size, such as small parabolic or horn antennae.

Antenna arrays in accordance with aspects herein can include flat arrays, parabolic arrays or horn type arrays and can include one or more point antenna as well as directional cellular telecommunication pole antenna arrays of antenna elements. For example, in experiments by the inventors and as seen in FIGS. 9-12, 14, and 22, a parabolic dish antenna having a diameter of approximately 19 inches to ten feet was used. The antennas used by the microwave receiver can be of any configuration, however, including fixed, rotational, or steerable antennas, and can be designed in accordance with the bandwidth to be detected. For example, if steerable antennas are used, such antennas can be either mechanically or electronically steered to detect directional beams (for example, to track a moving automobile or person). Other antenna arrays could include wide or narrow beamed configurations or lobes, depending upon the specific design of the individual application, field of view, and property to be protected. In addition, in some embodiments as described below, one or more antenna for passively detecting microwave radiation from an automobile or an intruder may be incorporated into a hand-held device (FIG. 5) that can be carried, for example, by a policeman or security officer, or into a device that can be worn, for example, as part of a hat or uniform. Moreover, a passive microwave device may be incorporated into a vehicle or robot which may be guided from central processor 1005 to monitor a protected space.

Figure 6:
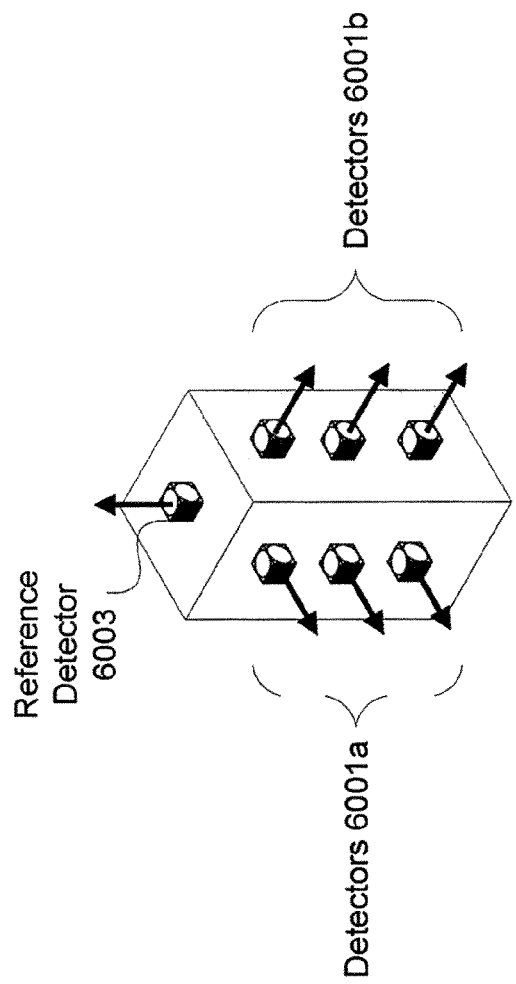
FIG. 6 depicts an exemplary embodiment of a multi-sided apparatus containing multiple passive microwave receiver and antenna arrays in accordance with one or more aspects described herein.
Figure 7:
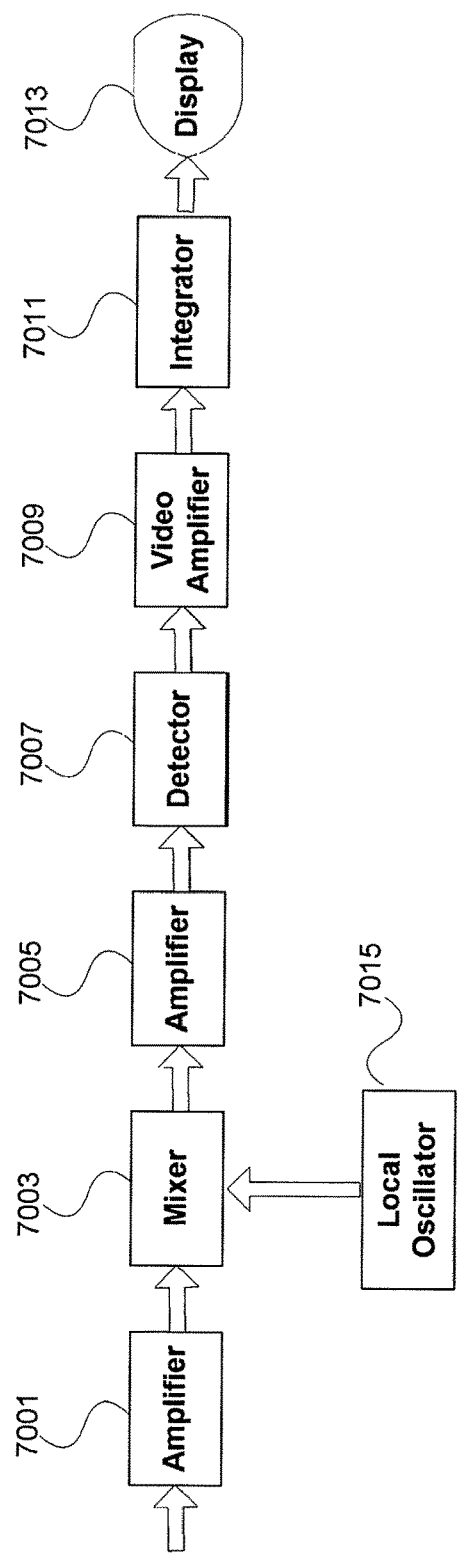
FIG. 7 depicts an exemplary embodiment of a superheterodyne receiver with signal display that can be used with a passive fire and intrusion detection system according to one or more aspects described herein.

An exemplary antenna array may be similar to that depicted in FIGS. 6 and 7 of U.S. Pat. No. 5,563,610 to Reudink. Such an array may receive microwave frequencies via a first element provided with a low noise amplifier circuit such as, for example, a model RAS-1420 LNA providing 28 dB of gain in the 1.420 to 1.427 GHz 27 MHz pass band of interest, available from www.radioastronomysupplies.com. A second or the same antenna element of the same array may receive microwave frequencies in the 1200-1.900 GHz band including the 1.420 to 1.427 GHZ band of interest for hydrogen line and black body emission of passive frequencies, for example via a ZHL-1217HLN circuit having 30 dB of gain available from www.minicircuits.com to capture black body emission at this pass band. A third low noise amplifier choice can be an amplifier such as a ZGL-2700 MLNW, providing 25 dB of gain in the 2.2 to 2.7 GHz band including a 2.690 to 2.700 GHz providing a 10 MHz band of interest. This third LNA may have its own antenna element or share an antenna element of the same array. When overlapping bands with protected microwave passive frequency bands are captured, any active frequencies may be filtered out using band stop filters so that only the desired passive frequencies are analyzed by the signal processor or, vice versa, a filter may be designed to pass the band of interest. Moreover, the protected frequency is received with no active radio interference and thus, even the smallest of measure values can be detected and analyzed with a high true desired signal to noise ratio.

In accordance with aspects herein, for any antenna array or antenna configuration, it can be desirable to calibrate an antenna using a reference target having a known temperature to provide a baseline reference temperature and a reference received energy level via a reference array 1003 of FIG. 1. One such method for calibration can involve using a Dicke switch method to compare the detected radiation with a known temperature source. Typical frequencies of operating a Dicke switch may be from 1 Hz to 10 KHz, with a conventional range being from 100 Hz to 1 KHz. A reference temperature can be provided by using a "hot load," for example, an object having a fixed temperature of 100° C., and the microwave radiation emanating from that object can be measured to use as a baseline reference. Alternatively, a known or ambient temperature such as that of a human body or a relatively stable temperature such as that of the ground, foliage, the sun and the like provide optional reference temperatures which require no power to generate.

Other reference temperatures can be used depending on the configuration and application of the antennae. Various calibration sources for temperature already exist in the environment, both inside and out and naturally vary depending on the time of day and weather. For antennae that are worn or hand-held or are moveable on a vehicle, the human body (skull or chest cavity) or the vehicle temperature may provide an appropriate reference temperature. In indoor installations, the wall or floor may be used as a suitable temperature reference source. In an outdoor installation, the ground can be used as a source of baseline reference energy because of its predictable temperature variance in view of time of day and weather conditions. Other outside references for temperature, for example, could include the temperature of the sun, the earth, or foliage of large trees. Each of these may be used to establish a reference temperature and a reference received energy level for the surrounding environment via a detector 1003. In addition, a calibration routine conducted over a period of time in a fixed system may record known objects such as vehicles or aircraft and the presence and intrusion of pet animals and other living organisms expected to be present. These calibration techniques may result in a known passive microwave image for storage in memory 1013 for subtraction from later received passive microwave readings taken in the presence of an automobile or intruder.

FIGS. 2-6 depict system embodiments for various exemplary applications of arrangements of antenna arrays that can be used in a passive microwave automobile and intrusion speed and temperature detection system and methods in accordance with one or more aspects described herein. It should be noted that the configurations shown in FIGS. 2-6 are exemplary only, and that other configurations and uses of passive microwave antenna arrays can be made within the scope of the present disclosure. The antennas may be close to or far away from the target source of the black body or spectral line microwave radiation. For example, in some embodiments, the antennas can be located as close as 2.5 meters and as far as 100's of meters from a target in a protected space, although, as discussed below, the target may be much farther away, since using the methods and apparatus described herein, an airplane (or an automobile traveling on a highway) can be detected at thousands of meters distance.

Figure 2:
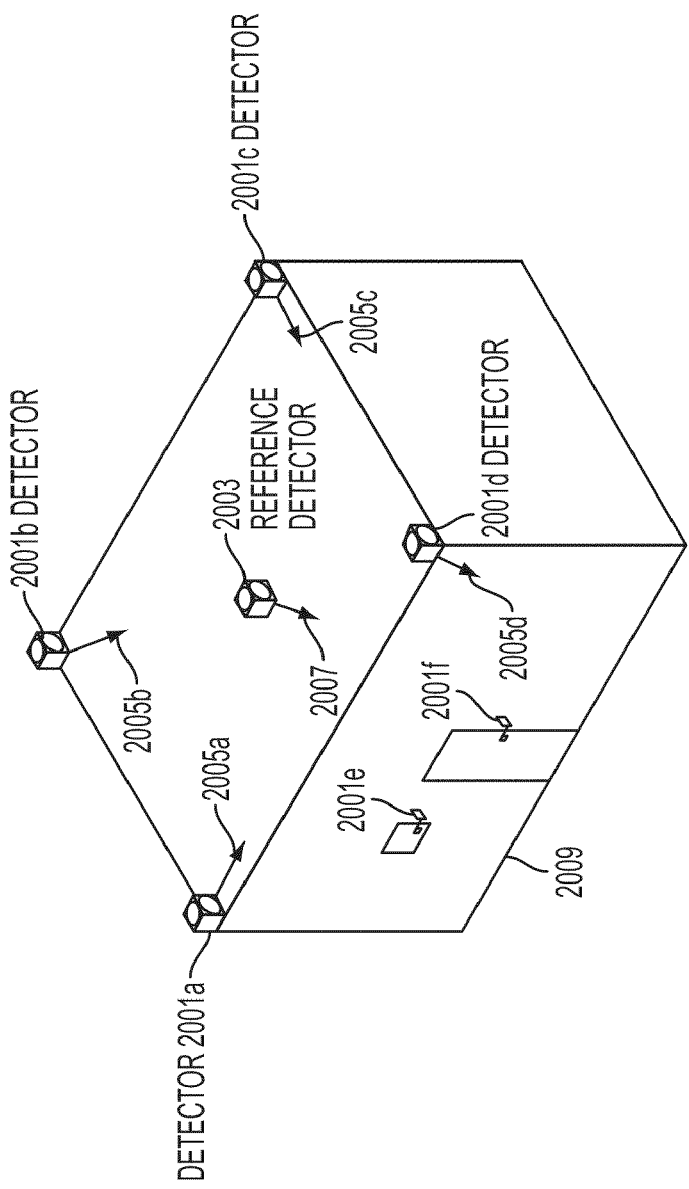
FIG. 2 is an exemplary array of microwave receivers and antennas placed in an enclosed space in accordance with one or more aspects described herein.

FIG. 2 depicts an exemplary array of antennas that can be used in an interior installation, for example, to protect an enclosed space. Spaces that can be protected by such a configuration include commercial and residential buildings, offices, warehouses, and other structures.

As shown in FIG. 2, a plurality of detector antenna arrays 2001a-2001f can be placed at spaced-apart locations around a perimeter of an enclosure 2009 where passive detectors 2001a-d are mounted in or on a wall surface pointing inward and detectors 2001e-f are protecting openings such as doors, gates, windows and the like. In an exemplary embodiment, each detector antenna array can be in the form of a cellular radio type pole array similar to those depicted in FIGS. 6 and 7 of U.S. Pat. No. 5,563,610 to Reudink. In one configuration, passive microwave detector antenna arrays 2001 for detecting black body and spectral line emission can be placed outside the walls, i.e., so that they can be seen by persons within the room. These can monitor across the entire microwave spectrum from 0.5 to 1000 GHz, or, for example, 1 GHz to 50 GHz. Alternatively, as noted above, microwave radiation (for example, drywall, brick, block or adobe) at, for example, 0.5 to 3 GHz can penetrate non-metallic walls, and therefore one or more of the detector antennas 2001a to 2001f can also can be placed within the walls. Placing the passive microwave detectors within the walls can be aesthetically desirable, but more significantly, can be advantageous in that an intrusion, temperature and speed detection system with detectors placed within the walls of an enclosure cannot be seen or tampered with by an intruder, thus providing additional protection. Moreover, the all may provide some insulation value such that readings from such a detector may not be susceptible high temperatures when compared to a detector mounted on the wall closer to a thermal event. A further embodiment may comprise both inside the all and outside the wall passive microwave detectors.

Also as shown in FIG. 2, the plurality of detector antennas 2001a-2001f can be arranged to detect radiation from different directions 2005a-2005g. Each antenna array 2001a-2001f may have a primary directional lobe covering from a wall which it faces to a center of the room. Two corners of a room may provide sufficient directionality to determine the precise location of an intruder in a room to an automobile in a parking lot or on the highway). Window or door detectors 2001e, f may be directed across the opening for detection of fire crossover or intrusion into the protected space within the depicted room. In addition, as discussed above, one of the antenna arrays may be configured to receive microwave radiation at one frequency band, for example, the 1.420 to 1.427 GHz 27 MHz pass band of interest for hydrogen line emission, while another of the arrays can be configured to receive microwave frequencies in the 1.200-1.900 GHz band including the 1.420 to 1.427 GHz band of interest and the several hydroxyl lines appearing between 1.612231 and 1.720530 GHz (and their Doppler effects). Reference detector 2003 can be configured to detect radiation from a baseline reference source such as a wall, the ceiling (also serving as the floor above) or the floor. The radiation detected at detector antennas 2001a-2001d can be compared with the baseline radiation detected by reference detector 2003 from direction 2007 and processed as discussed in more detail herein to provide detection of a fire or intruder within the enclosure 2009.

Figure 3:
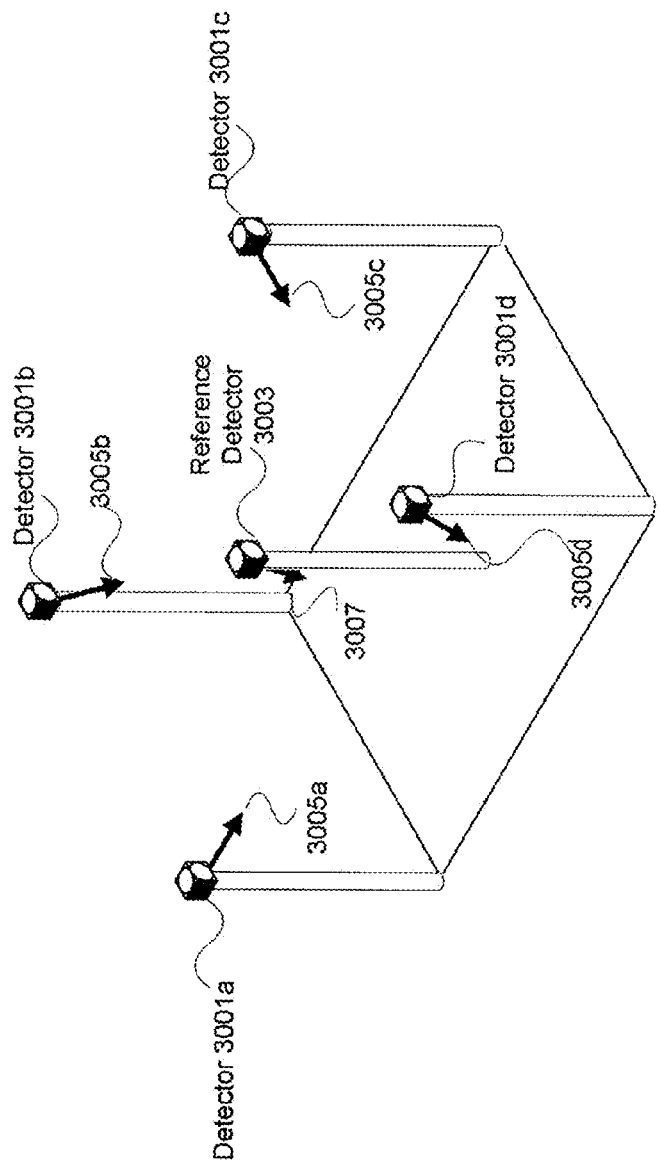
FIG. 3 is a block diagram of an exemplary array of microwave receivers and antennas placed in an out-of-doors space in accordance with one or more aspects described herein.

Another exemplary configuration of detector antenna arrays is shown in FIG. 3. As shown in FIG. 3, a plurality of detector antenna arrays 3001a-3001d can be placed in spaced-apart locations around a perimeter of an out-of-doors space to be monitored such as a parking lot, college campus, hazardous waste dump, or storage facility. As with the detector antenna arrays described above with respect to FIG. 2, the plurality of detector antennas 3001a-3001d can be arranged to detect microwave radiation from different directions 3005a-3005d, at different microwave frequencies, or both. In addition, as with the indoor configuration described above with respect to FIG. 2, reference detector 3003 can be configured to detect passive microwave radiation for black body and spectral line emission from a baseline reference source from direction 3007 such as the ground, the sun, or foliage of large trees. The microwave radiation passively detected by detector antennas 3001a-3001d can be compared with this baseline black body or expected spectral line emission radiation, to provide detection an automobile or intruder within the perimeter defined by the antenna installation.

Figure 4:
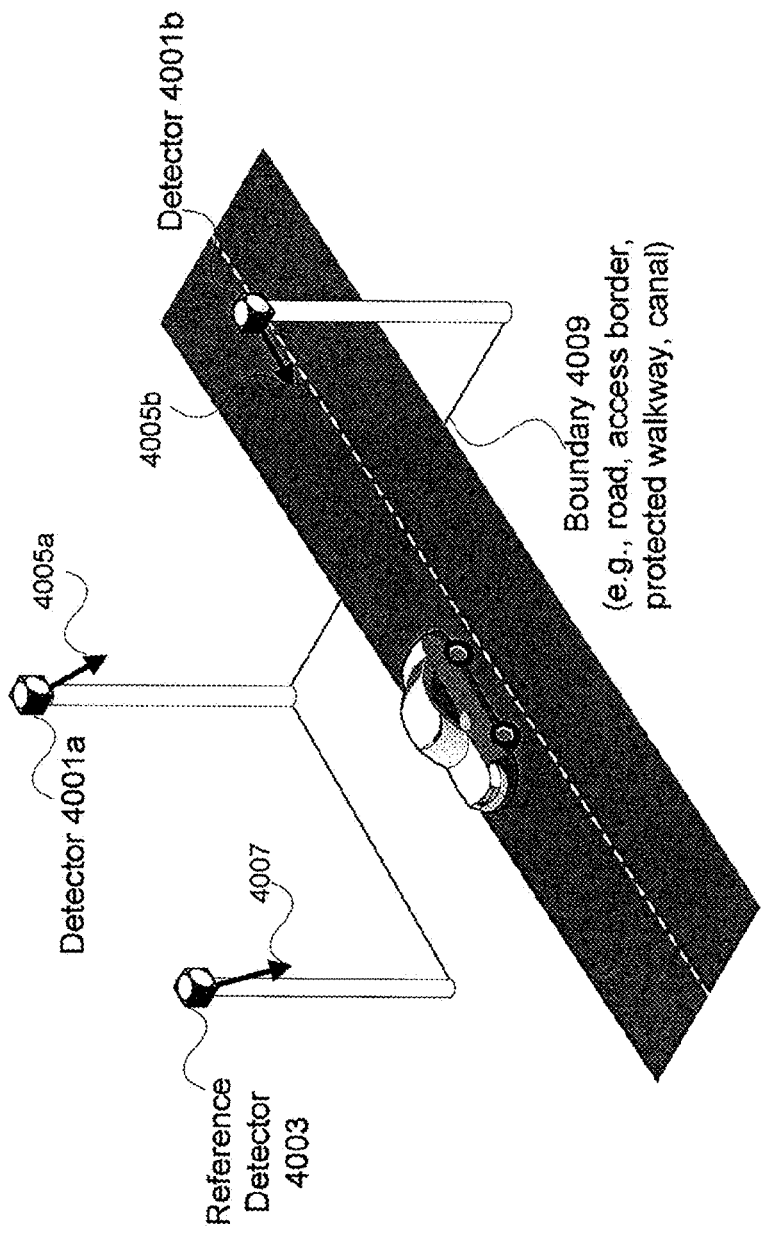
FIG. 4 is a block diagram of an exemplary array of microwave receivers and antennas placed near a boundary to be protected in accordance with one or more aspects described herein.

FIG. 4 depicts an exemplary configuration of detector antenna arrays along a boundary such as a road, border, walkway, canal, etc. In this embodiment, microwave detection in accordance with aspects herein can be particularly useful for intrusion detection, since the presence of a body crossing the boundary can be almost instantaneously detected by the use of passive microwave detection of black body microwave emission across a microwave spectrum with characteristic increasing emission with increasing frequency (decreasing wavelength). As shown in FIG. 4, two or more detector antenna arrays such as arrays 4001a and 4001b can be placed at spaced apart locations around the boundary to be protected, for example, at opposite ends of a line demarcating the boundary. As with the detector arrays described above, detector arrays 4001a and 4001b can be configured to passively detect microwave radiation from directions 4005a and 4005b, at different microwave frequencies, or both frequencies or frequency ranges. The microwave radiation so detected can be compared to baseline radiation detected by reference detector 4003 in direction 4007 to provide immediate indication of the presence of an intruder at the boundary. As will be discussed further herein, a speed detection of passive microwave frequencies can demonstrate movement of an intruder within a protected space or movement of an automobile simply from calculating an average speed within the lobe from lobe distance measurement and tune within the lobe.

In an embodiment as shown in FIG. 5A, a passive microwave intrusion detector 5001a having a directionality 5003a can be incorporated into a device that can be held by a user to detect microwave radiation emanating from an intruder or automobile. In an embodiment such as is shown in FIG. 5B, one or more passive microwave intrusion detectors 5001b-5001d, either alone or combined with conventional intrusion, speed and temperature detectors, can be incorporated into devices that can be worn by investigative personnel, such as on the front 5001b or back 5001c of a uniform and or mounted on a cap or hat 5001d. These antennae can have respective directionalities 5003b-5003d to enable the wearer thereof to detect passive black body microwave radiation in several different directions at once. They may passively detect at all microwave frequencies across an entire 0.5 to 1000 GHz spectrum. In some embodiments, a conventional pressure pinhole camera may be added to the cap or hat and provide a visual display through smoke or weather conditions since microwave may penetrate through fog or smog to provide a more visible indication to the investigator of the contents of a room experiencing an intrusion. In some embodiments, a microwave radiation detection device in accordance with aspects described herein can include an antenna proximate to the body to provide a stable reference temperature against which to measure temperature. Such a reference requires no power to generate in contrast to a predetermined temperature source. In some other embodiments, a global positioning system (GPS) apparatus can be incorporated into an investigator's uniform, and can be used to provide a guide regarding a building plan or layout, for example by using a map stored in central processing unit 8009 memory, or memory associated therewith, shown in FIG. 8. For example, a cap or hat may be provided with a display for wireless guiding data transmitted from signal processor 1005 and thus, for example, an investigator may be guided to door openings and go directly to an intruder that the first responder would not otherwise see but for passive microwave detection apparatus in accordance with aspects described herein.

Figure 5:
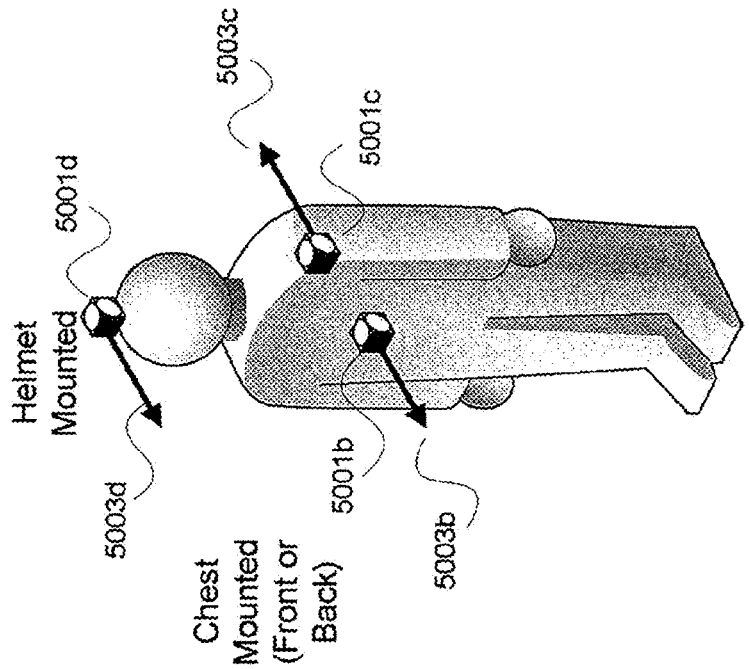
FIG. 5A depicts an exemplary embodiment of a wearable apparatus containing a passive microwave receiver and antenna array in accordance with one or more aspects described herein.
FIG. 5B depicts an exemplary embodiment of a handheld apparatus containing a passive microwave receiver and antenna array in accordance with one or more aspects described herein.

Such wearable or hand-held passive microwave intrusion detectors of FIG. 5 can also enable such investigators to detect the presence—or absence—of persons or other living beings in a space before entrance into the space (by seeing through walls) so that investigators do not have to go into dangerous situations to confront an intruder who in fact is not there. In addition, a passive microwave detector worn on a hat or cap can serve as an early predictor of increasing temperature in a protected area. A predictive early warning of a hazardous condition through black body emission could enable investigators to evacuate both themselves and other building occupants to a safer location and away from an intruder.

Components for use by such investigators may be designed to include electronic components operable without distortion at higher temperatures such as 200° Fahrenheit (93° C.).

FIG. 6 depicts an exemplary embodiment of a multi-sided speed and intrusion detection apparatus comprising a detector array having a plurality of sets of passive microwave receivers and antennas 6001a, 6001b ... 6001n, where n is the number of sides in the apparatus. The passive microwave radiation detected by these receivers is compared to the radiation detected by reference detector 6003 which can be placed at a top side of the apparatus as shown in FIG. 6. This embodiment of a passive microwave speed and intrusion detection apparatus can be in either a stationary or portable configuration and can be used to provide automobile and intrusion detection in locations such as along fence lines or highways; in parking lots, hazardous waste dumps, at chemical sites, or shipyards. Because microwave radiation travels through the air and therefore can be detected by an apparatus such as illustrated in FIG. 6 placed atop a tower at an elevated location, potentially intruders can be quickly detected.

The output of the antenna arrays in a passive microwave automobile, speed, temperature and intruder detection system, whether in any of the configurations discussed above or otherwise, can be fed to a superheterodyne receiver shown in FIG. 7. As shown in FIG. 7, a superheterodyne receiver with a signal amplifier can comprise an amplifier 7001, for example, a conventional low noise block amplifier or low noise amplifier possibly requiring a bandpass filter having superior noise performance, a mixer 7003, and a local oscillator 7015 for demodulating the received signal (up to 1000 GHz to an intermediate frequency (H) signal, for example, in the 100 MHz to 0.5 to 2.5 GHz range. The IF signal may then be amplified at amplifier 7005 and transmitted by wired or wireless means to a signal processor 1005 at a central site as shown in FIG. 1 for further processing and compared with stored data in memory for an identified site (room, protected area or the like) and with characteristic black body emission characteristics data.

The signal processor 1005 shown in FIG. 1 at a central site may comprise elements 7007-7013 shown in FIG. 2. At the central site, the received IF signal may be detected as a voltage and associated frequency or frequency range at detector 7007, provided to a video amplifier 7009 and integrator 7011 for integrating the baseband signal across the band of interest, and displayed at display 7013.

The output of the amplified signal, also referred to herein as a brightness temperature signal, may be interfaced to a laptop computer or smaller computer, via a digital signal processor such as a Motorola DSP 56800 discussed above, such as a personal hand-held or worn computer. In some embodiments, such a computer can include a display for displaying a voltage reading/time which is converted to a temperature and/or an average speed in a beam.

Figure 8:
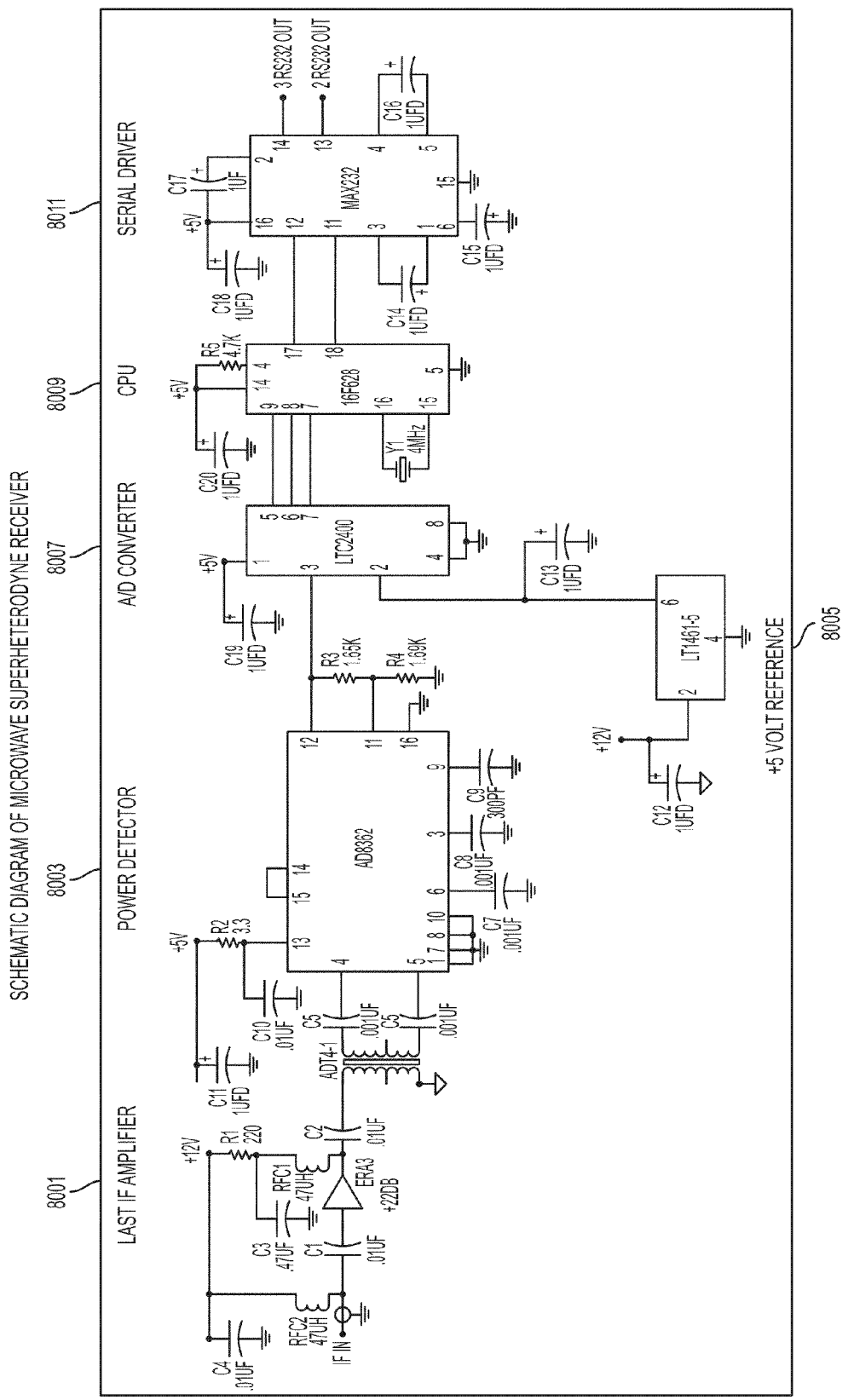
FIG. 8 is a schematic of an exemplary passive microwave heterodyne receiver which can be used in an individual antenna array such as the array shown in FIG. 2.
Figure 20:
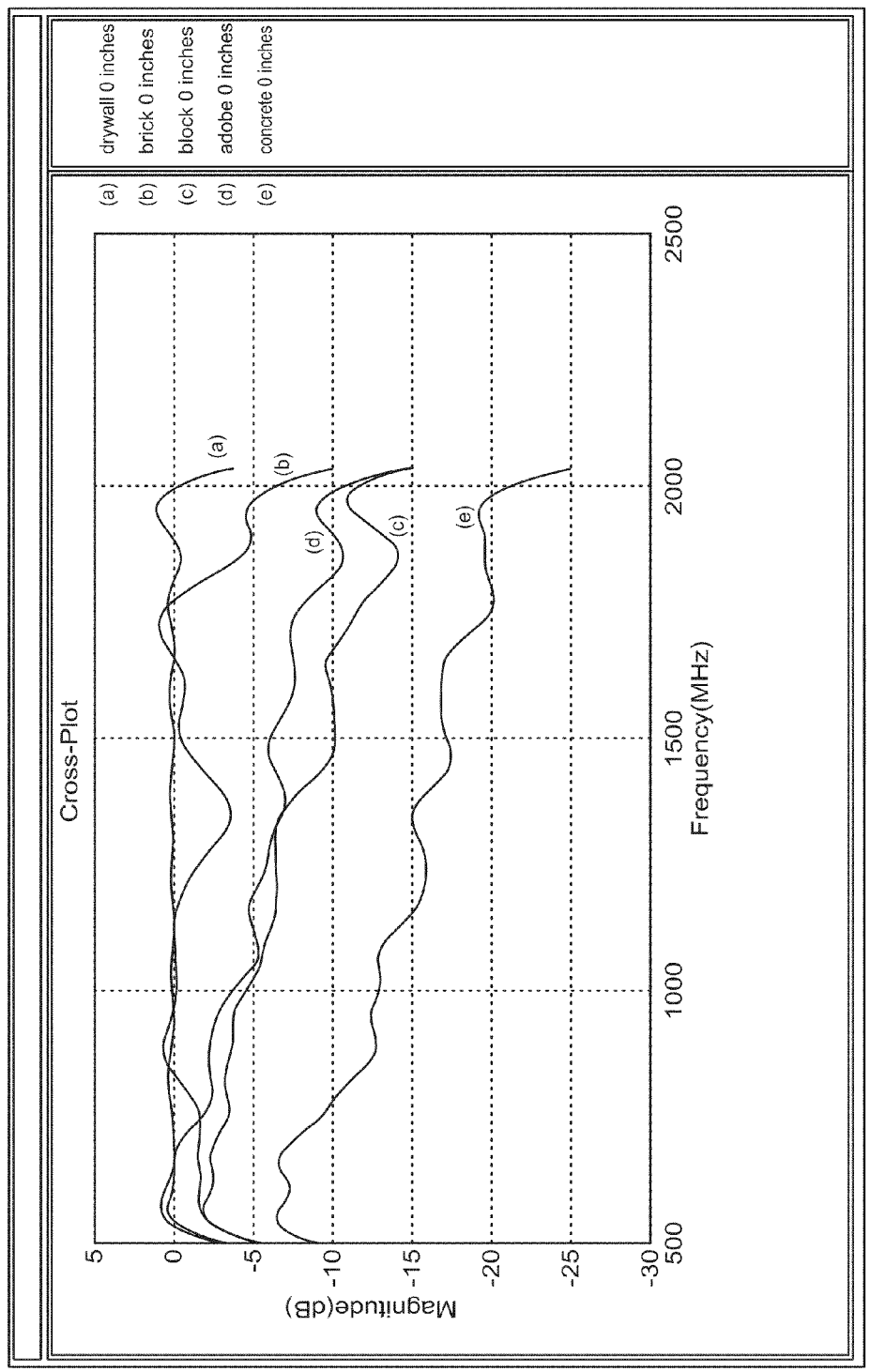
FIG. 20 provide a graph of measured attenuation of microwave frequencies between 0.5 and 2.5 GHz for drywall, brick, block, adobe and cement.

FIG. 8 provides a schematic of an electric circuit that can be used with a superheterodyne microwave receiver in accordance with one or more aspects described herein. As shown in FIG. 8, an intermediate frequency (IF) amplifier 8001 may be tuned for the receive frequencies of plural antenna arrays operating at frequencies between 0.5 and 1000 GHz and may match impedances for optimum transmission of data regarding passively detected temperatures (voltages). The output of such an IF amplifier 8001 can be fed via a transformer (which can perform impedance matching, isolation and other functions) to a detector 8003 such as a 50 Hz to a 0.5 to 2.7 GHz range analog detector circuit such as Analog Device AD 8362 circuit 330, which may be likewise tuned to either a specific frequency (such as that of an expected spectral line) or frequency range (for example for black body emission characteristic detection). Referring briefly to FIG. 20, such as frequency range as 0.5 to 3 GHz may be useful for in-the-wall or through-the-wall passive microwave fire and intrusion detection. Its output in turn can be provided to circuitry 8005 which includes a reference source voltage, for example, an LT1461-5 circuit 340 for providing a reference voltage of five volts for use at a LTC 2400 analog to digital converter 8007. The digital output of A/D converter 8007 can be provided to a CPU 8009 for conversion into, for example, ASCII for data entry into a signal processing unit computer 1005 and memory 1013 shown in FIG. 1. The depicted CPU is one manufactured and known as a PIC16F628 microcontroller but any suitable CPU can be used. The output of CPU 8009 can be provided to a conventional serial driver 8011 (for example, a 232 IC) for serial input to a signal processor/memory 1005/1013. In this manner, the output may be temperature compensated (via the Dicke switch) for a reference input and then fed to a central processing unit for analysis and, for example, display. Such a circuit may provide one input of many to signal processor 1005 shown in FIG. 1.

FIGS. 9-18 and 23-25 depict various aspects of testing of a passive microwave receiver apparatus by the inventors hereof. As shown in FIGS. 9-12 and 14, testing was performed using a small (approximately 19-inch) parabolic dish antenna and with respect to FIG. 23-25 by a somewhat larger antenna, but it should be noted that such a parabolic antenna is only one of many antenna types that can be used in accordance with aspects described herein, and that other antenna configurations such as flat arrays, horn type arrays, point antennas, or directional antennas such as cellular telecommunication pole antenna arrays can be used.

Figure 9:
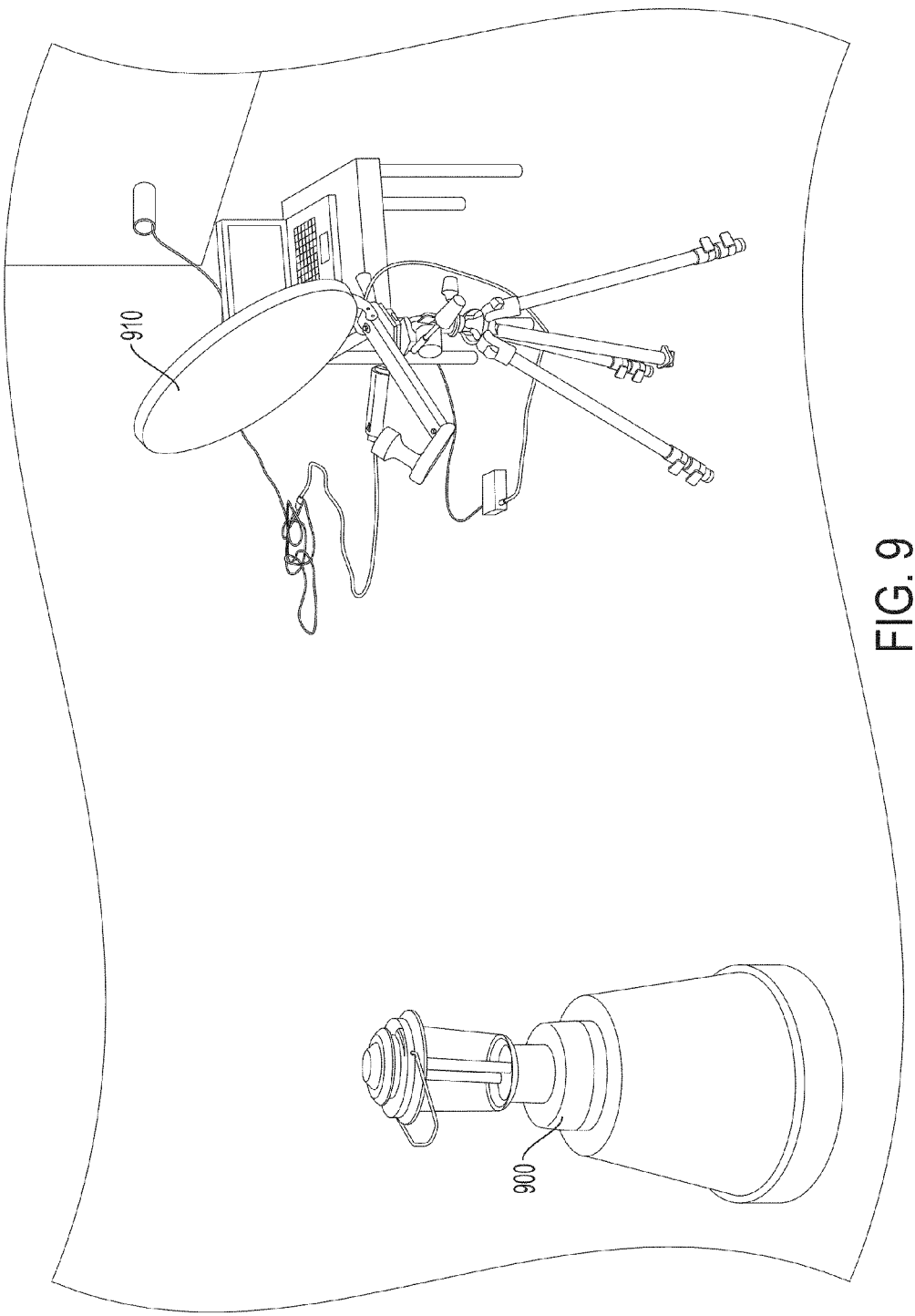
FIG. 9 is a photograph depicting use of a light source to aim a passive microwave receiver in accordance with one or more aspects onto a location of a test fire during experimental testing described herein.

FIG. 9 is a photograph depicting the use of a light source, here a lantern, by one of the inventors hereof to aim a microwave receiver onto the location of a test fire. The light source, while emitting light in the visible part of the electromagnetic spectrum, also emits microwave radiation which can be detected by the parabolic antenna shown in the photograph. In the present photograph, a two-bulb portable battery-powered fluorescent lamp was used, but in alternative embodiments, other light sources for example, a laser light source, can be used to direct an antenna to a region of interest for more accurate long-range out-of-doors environments.

Figure 10:
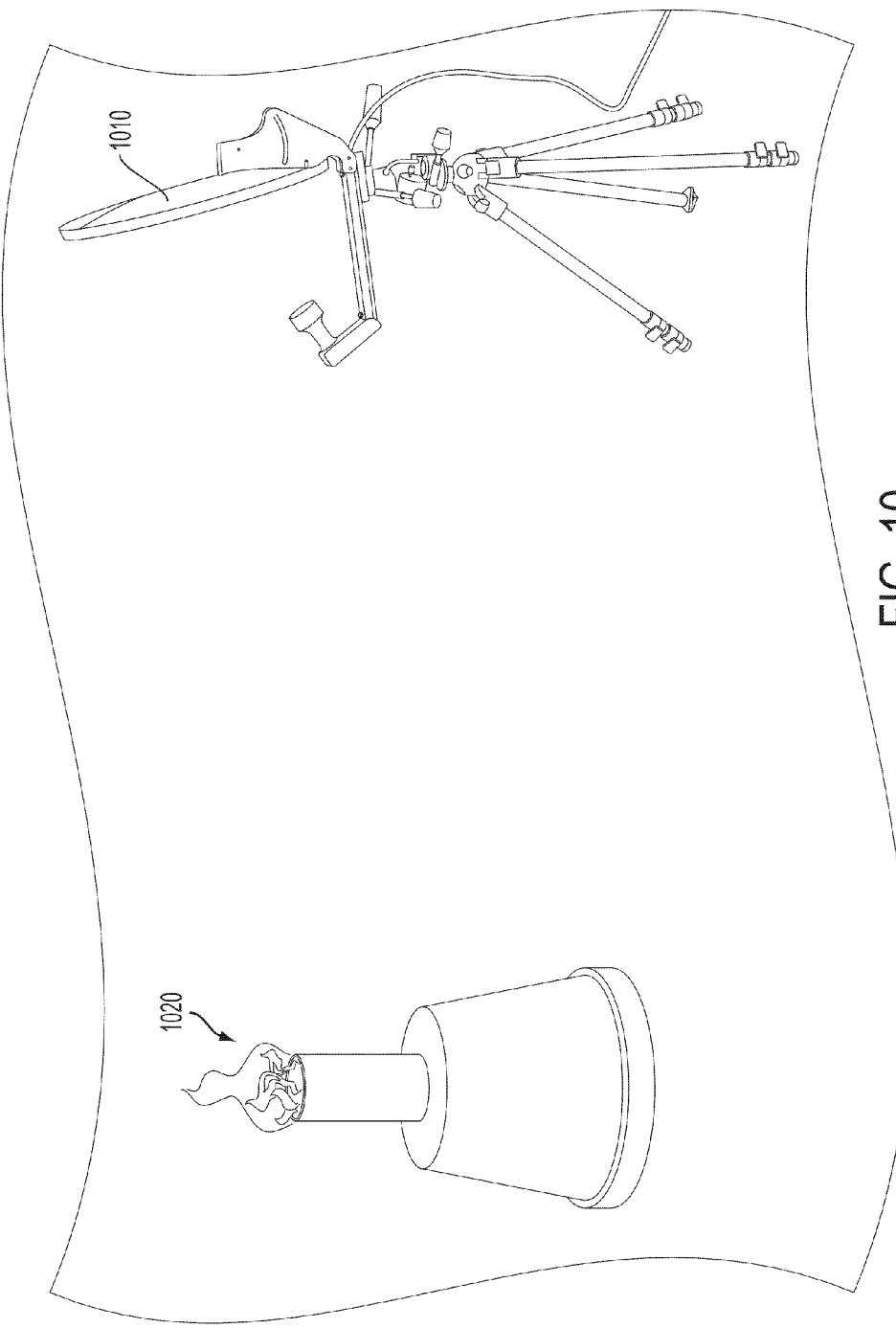
FIG. 10 is a photograph depicting use of a passive microwave receiver according to one or more aspects herein with a flaming test fire comprising burning shredded paper in an enclosed space.
Figure 11:
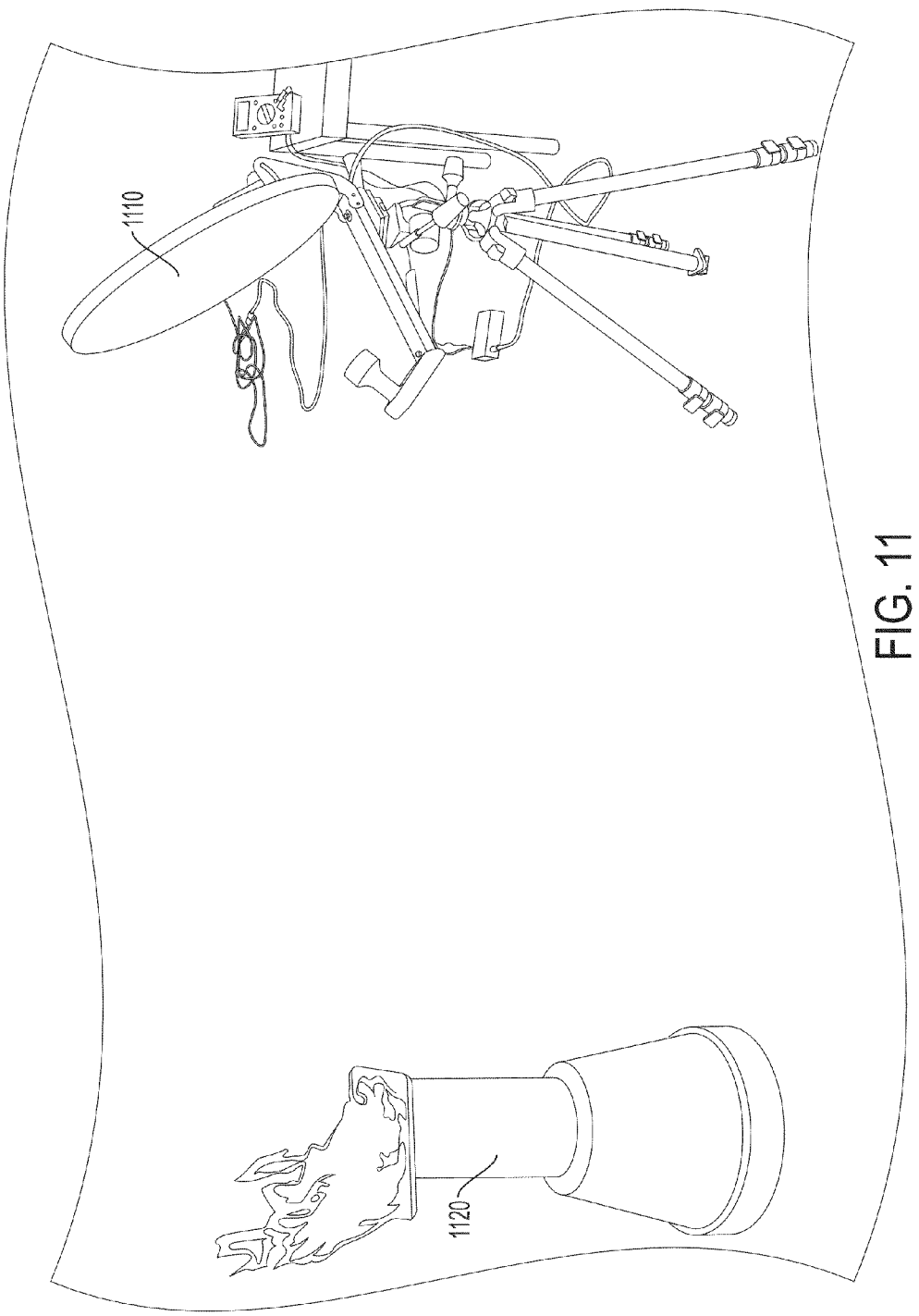
FIG. 11 is a photograph depicting use of a passive microwave receiver according to one or more aspects herein with a test fire comprising burning Isopropanol on a pan.
Figure 12:
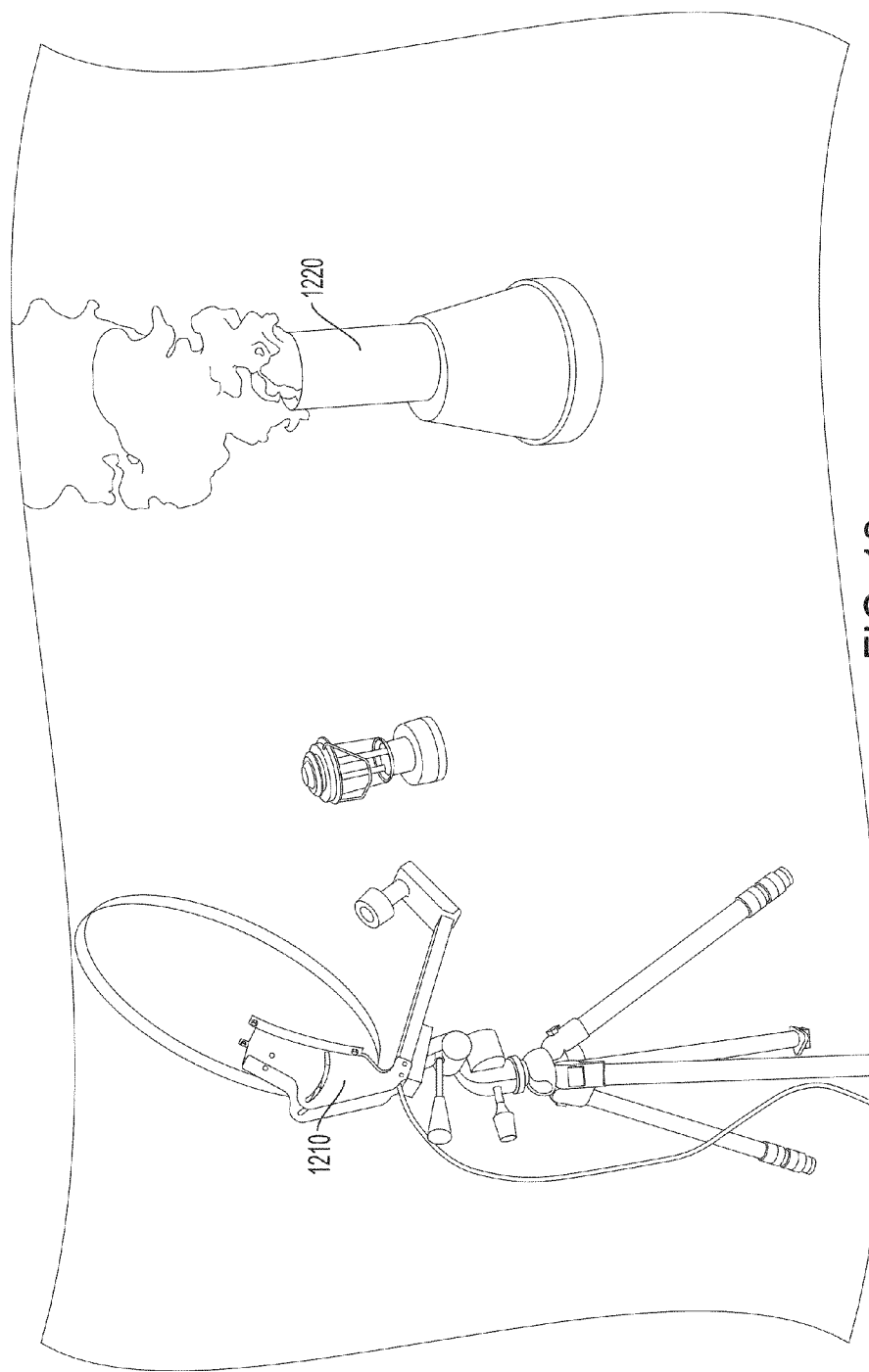
FIG. 12 is a photograph depicting use of a passive microwave receiver according to one or more aspects herein with a smoldering test fire comprising burning shredded paper in an enclosed space.

FIG. 10 is a photograph depicting use of a microwave receiver to detect a flaming fire comprising burning shredded paper in a confined space, as would occur in a typical trash can fire. FIG. 11 is a photograph depicting use of a microwave receiver to detect a flaming fire comprising isopropanol burning in a pan, as might occur in a chemical fire having a flame and little smoke. FIG. 12 is a photograph depicting use of a microwave receiver to detect a smoldering, i.e., non-flaming, fire comprising burning shredded paper, as might occur in a trash can fire before full ignition occurs and there is considerable smoke.

Both the burning and smoldering shredded paper were shown to be easily detected due to increased amounts of blackbody radiation produced by these fires. However, the flaming pan fire, since it generates less smoke and less amounts of blackbody radiation, would have been more easily discovered using conventional rate-of-rise temperature and or flame detectors. Alternatively, such a fire may be detected by HCl passive microwave spectral emission detection, or, if sufficiently hot, by passive microwave detection of certain spectral lines such as hydrogen and the hydroxyl radical (and Doppler effect or shedding frequency detection).

Figure 13:
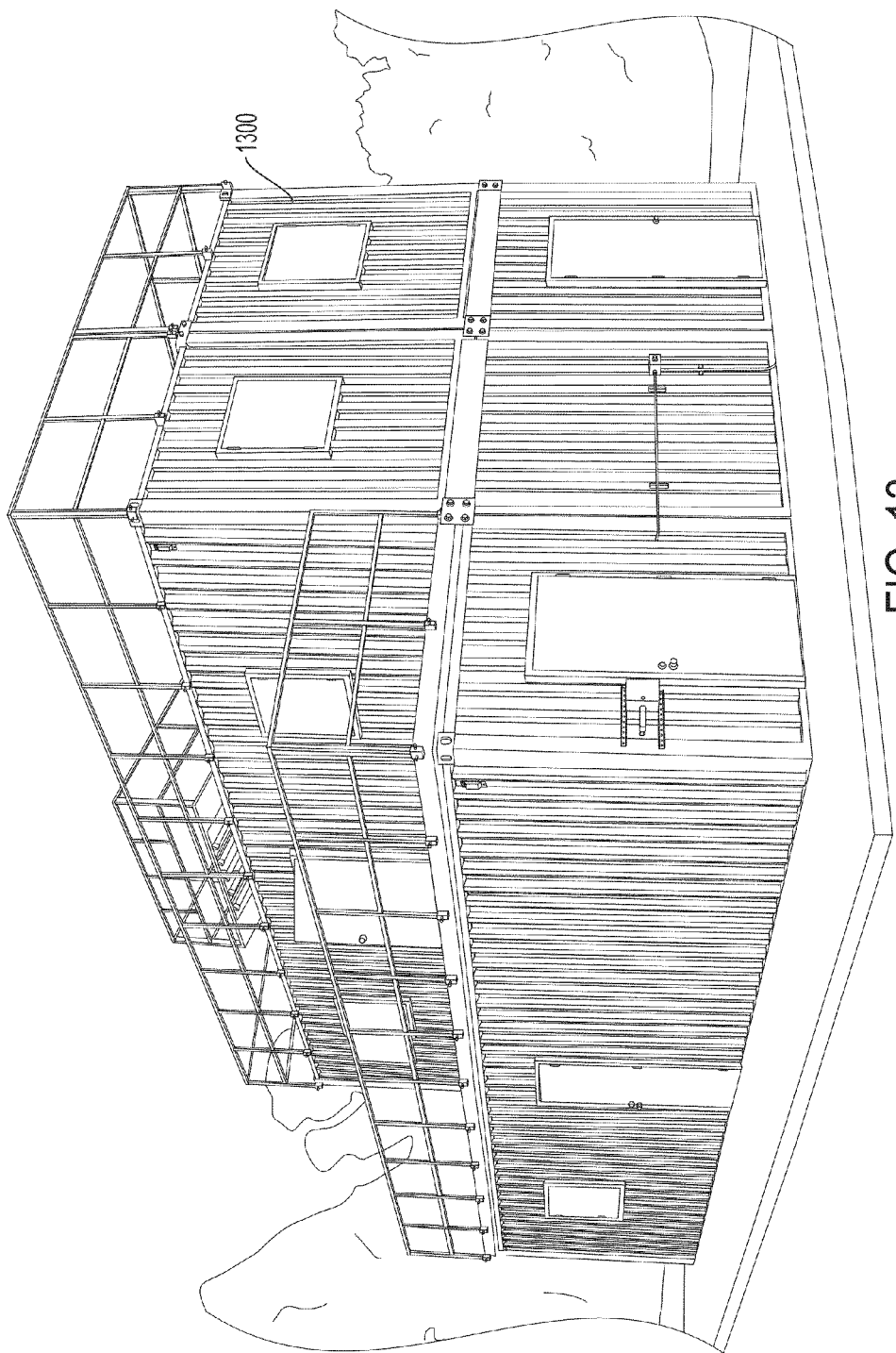
FIG. 13 is a photograph of a shielded steel building used during tests of a passive microwave fire and instruction detection apparatus in accordance with one or more aspects described herein.
Figure 14:
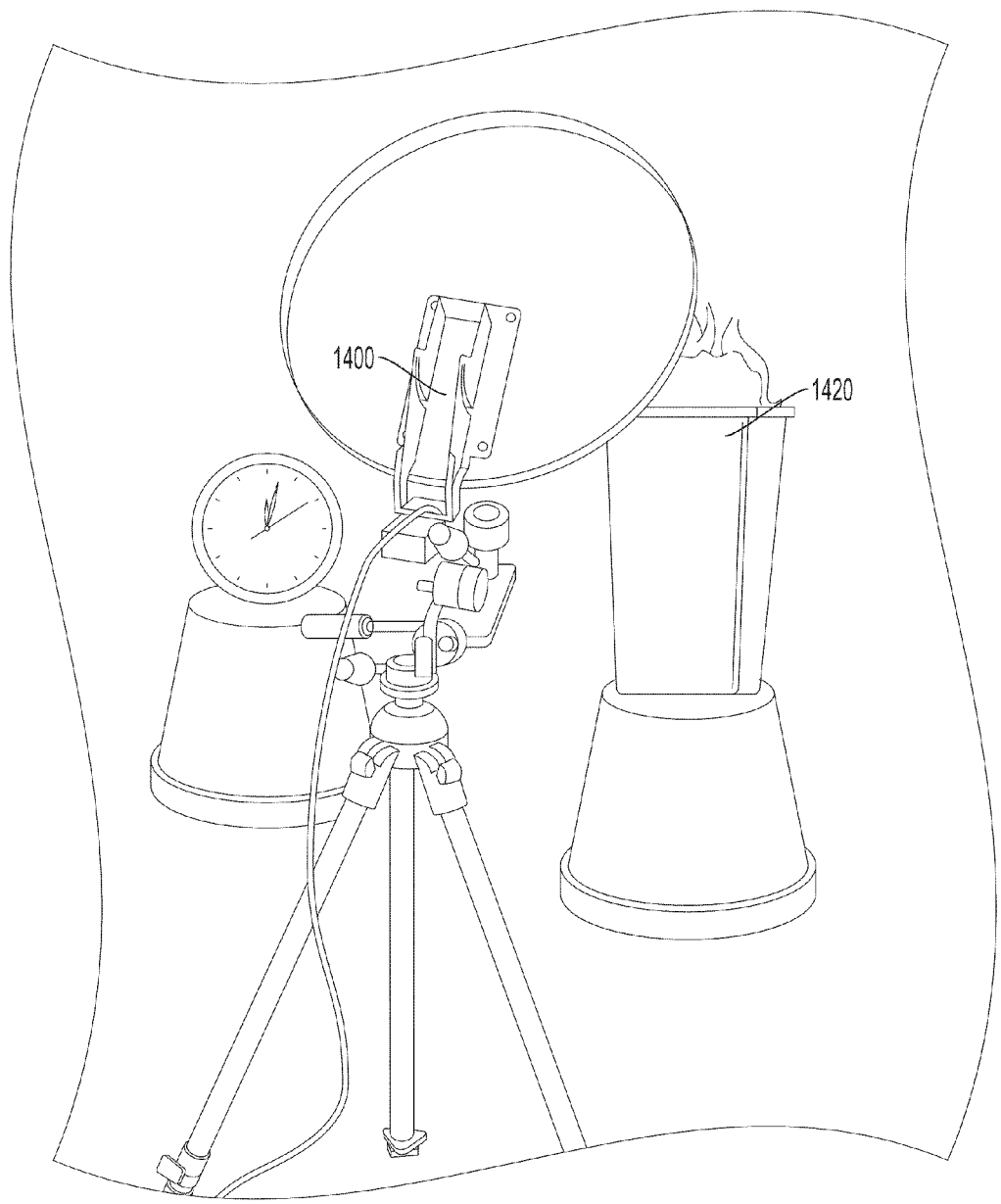
FIG. 14 is a photograph of a fire test conducted during ignition of a fire within the shielded steel building shown in FIG. 15.
Figure 15:
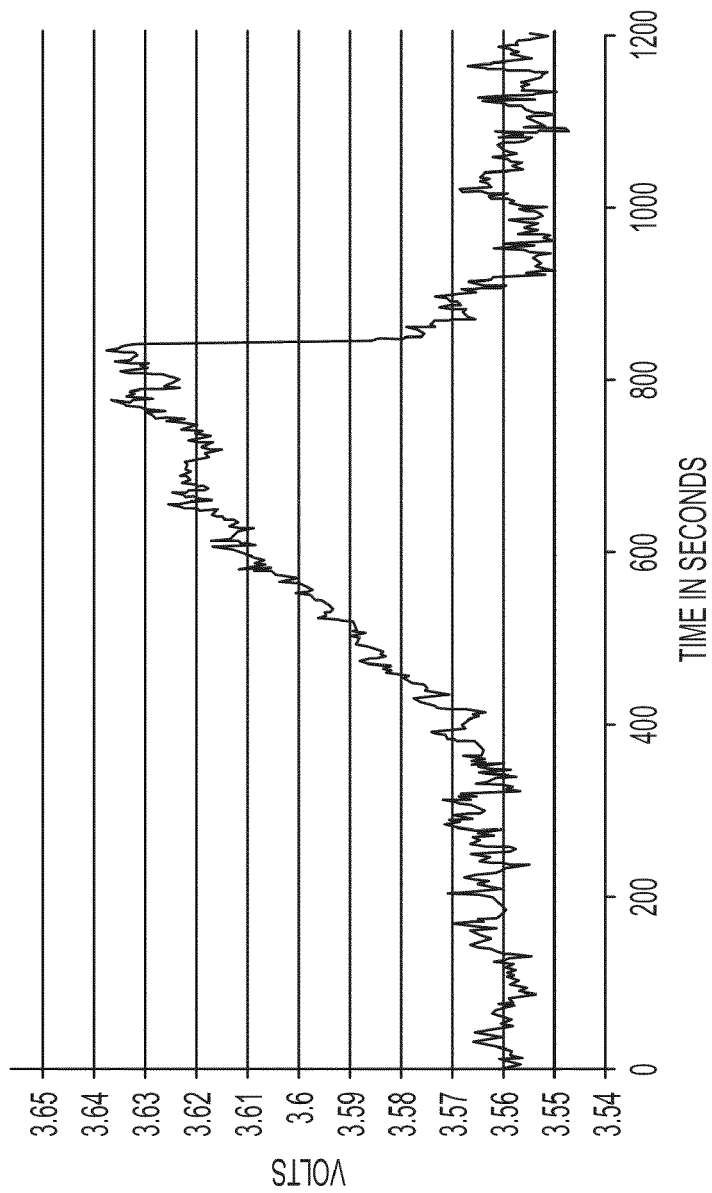
FIG. 15 depicts an exemplary set of voltage readings output from the fire test conducted within the shielded steel building shown in FIG. 13.

Other testing was performed in a shielded steel building as shown in FIGS. 13 and 14. As noted above, microwave radiation does not penetrate metal walls and so the building acted, in essence, as a "Faraday cage" blocking out any external extraneous electric fields or electromagnetic radiation. It thus could be ensured that any microwave radiation detected by the inventors during their tests came from the fire and not from any sources outside the building. As shown in FIG. 14, a test fire was ignited and the antenna set up to monitor the fire during the ignition, growth, steady state, and decay stages. A graph of the voltage readings from this test fire is shown in FIG. 15. The voltage readings indicate and track a steady increase of temperatures until its peak after approximately 800 seconds, when the fire was then extinguished.

Figure 16:
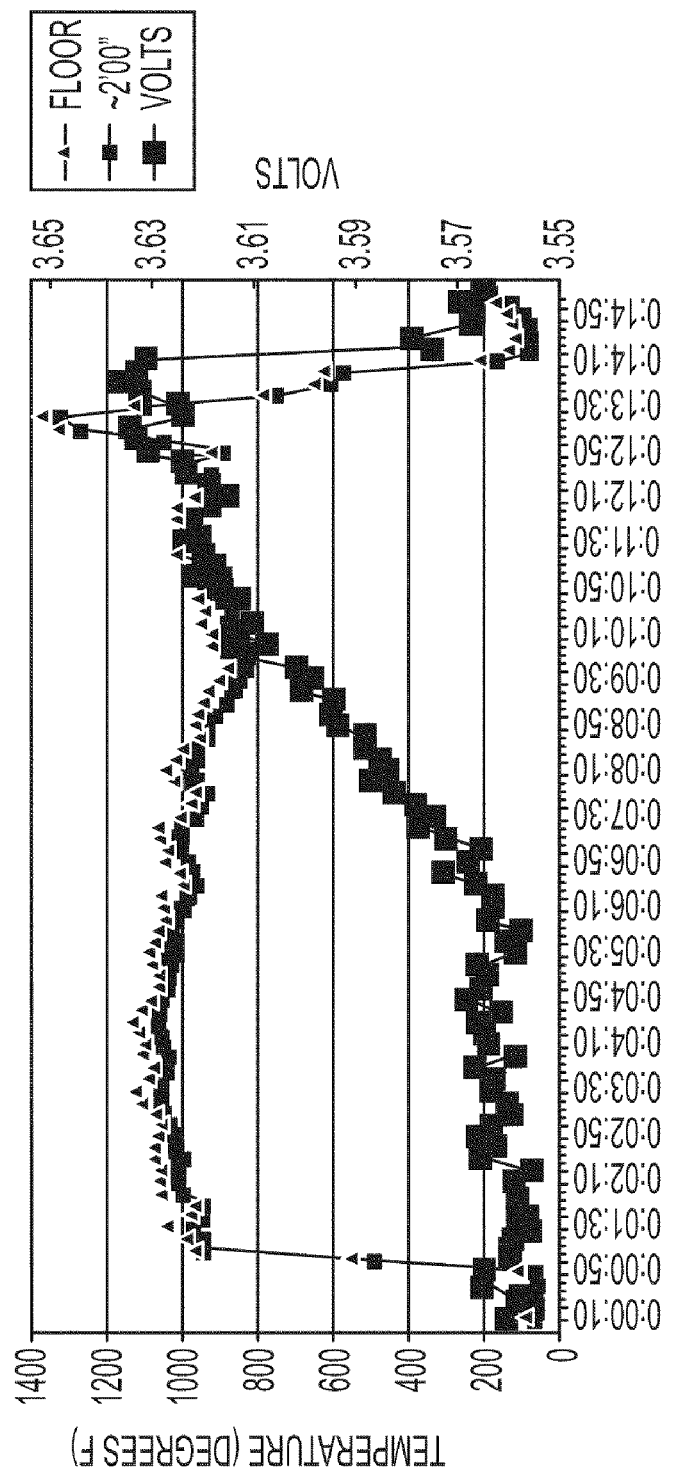
FIG. 16 depicts time-varying thermocouple temperature readings at approximately 2 feet (0.61 meters) above the floor level overlaid with the voltage output readings from the fire test conducted within the shielded steel building shown in FIG. 13.

During the same testing as performed in a shielded steel building as shown in FIGS. 13 and 14, thermocouple temperature data was also recorded at the floor, ceiling, and directly above the burning object at approximately 2 feet (0.61 meters) above the floor. This temperature data is shown in FIG. 16 as an overlay on the data previously shown as voltage data in FIG. 15. Note that this FIG. 16 shows a sharp increase in temperature after ignition, leveling off at approximately 1000 degrees Fahrenheit (539 degrees Celsius), and quickly dropping after extinguishment of the fire after approximately 800 seconds. Besides HCl spectral lines at passive microwave frequency, some spectral emission may be detected at hydrogen and hydroxyl radical lines and black body radiation may be observed across a broad frequency spectrum characteristic of a flame of such a fire at many stages.

Figure 17:
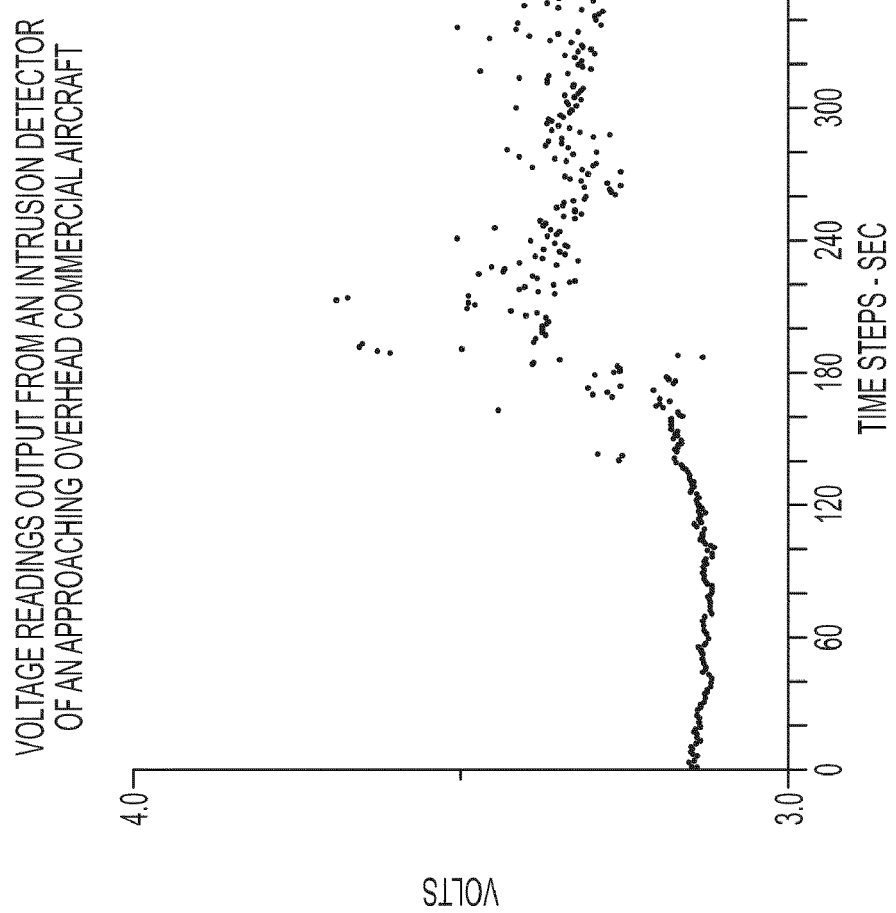
FIG. 17 depicts an exemplary set of voltage readings output from an intrusion detector due to the presence of an approaching overhead aircraft in accordance with one or more aspects described herein.

Further experimentation by the inventors demonstrates the use of passive microwave radiation detection in the field of intrusion detection via black body emission. Testing by the inventors showed that approaching overhead aircraft could be detected and, per FIGS. 22-25, human intruders and automobiles, either because it provided a reflective interference easily detected by the apparatus because it emitted microwave (radar) energy that could be detected as a change in voltage. For example, the scatter plot in FIG. 17 shows a positive scattered pattern of voltage readings that occurred when an aircraft was recognized over the horizon and flew over the test site at the time the readings in FIG. 17 were being made. Since an application of microwave fire or intrusion detection may be subject to false alarms by spurious accidental or intentional jamming signals on or surrounding the operational passive microwave frequency(ies) or frequency band(s), anomalies with known characteristics may be stored in central processing unit 1005 memory and subtracted or filtered from recorded measurement. Alternatively or in addition, the use of protected passive radio astronomy frequencies may ensure that few false alarms are triggered without having to filter anomalous radiation from active known or unknown sources.

Figure 18:
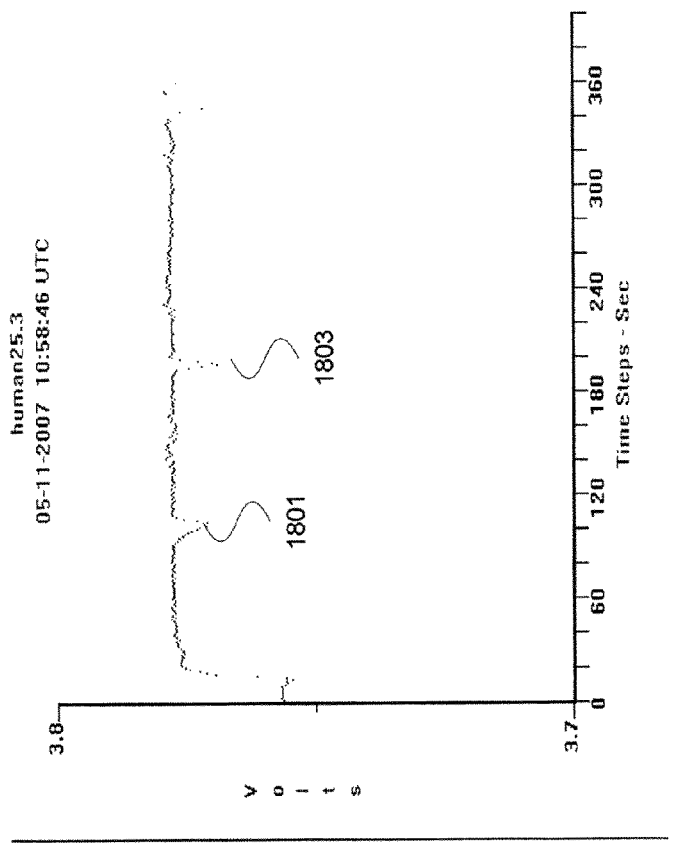
FIG. 18 depicts another set of voltage readings output from an intrusion detector due to the presence of a human at 25 and 50 feet in accordance with one or more aspects described herein.
Figure 19:
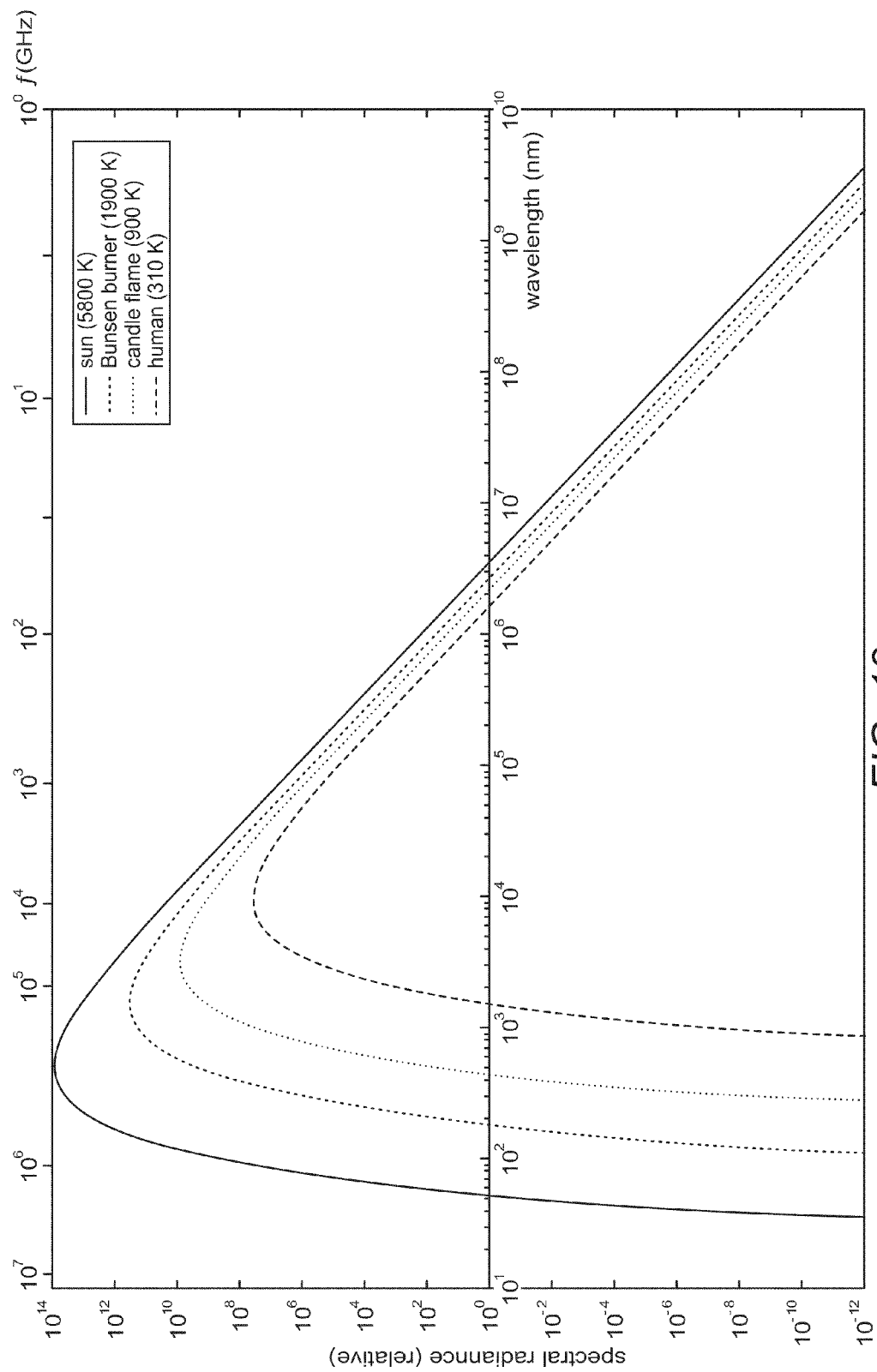
FIG. 19 provides a graph providing relative black body spectral emission decreasing frequency/increasing wavelength for the sun, a Bunsen burner, a candle and a human body.
Figure 25:
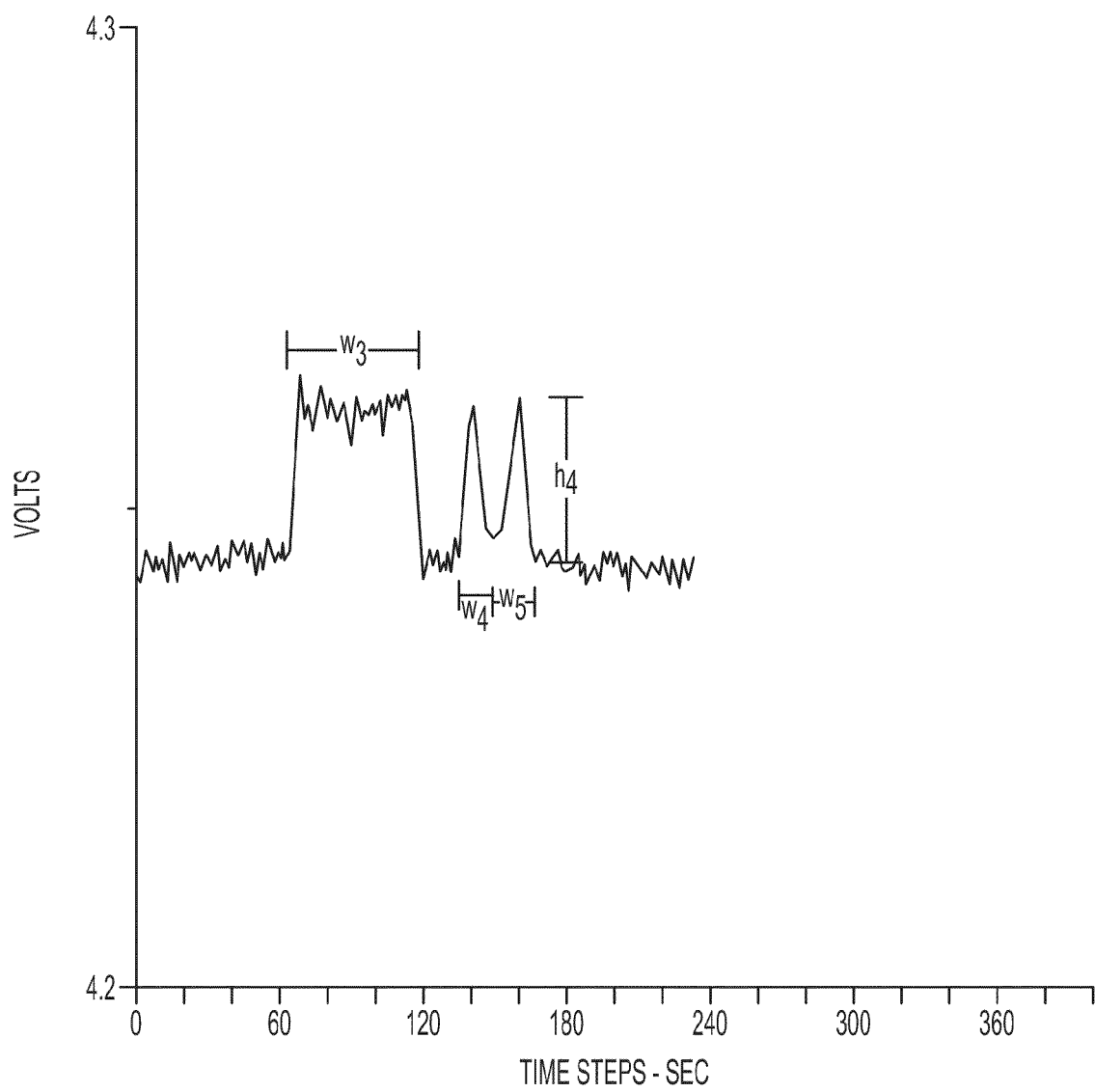
FIG. 25 provides a voltage signal plot over time for a human being at approximately 50 feet from the passive microwave receiver having a parabolic antenna being detected for a period of approximately 50 seconds and then at two later points in time crossing the beam path twice.

Similarly, testing by the inventors showed the usefulness of a microwave detection apparatus as an intrusion detector via passive black body microwave and Doppler effect detection. In particular, as shown in FIG. 18 and FIG. 25, a human may be detected at 15 meters (50 feet) from an array or antenna element of a parabolic antenna pointed in their direction. As shown in FIG. 18, a voltage drop occurred when a human being passed within range of the directional microwave receiver. Negative voltage 1801 represents a human at a relatively close distance to the detection apparatus while negative voltage 1803 represents a person farther away showing movement of the individual over time. Per the apparatus of FIG. 22 and the graph of FIG. 25, a positive voltage indicates temperature of the human and average speed within the antenna beam lobe. The same sized person was detected at all points. Consequently, a person may be ranged by their size at signal processing apparatus 1005 and triangulation or other conventional methods used to precisely locate such a person. It is to be noted that a human may be detected as a negative or positive voltage reading when compared to a reference voltage reading and so may be distinguishable from a fire or automobile which is detected by an oppositely signed voltage reading when compared with a reference voltage. Depending on the circumstances, such a detected person may be an intruder, and consequently an embodiment of a passive microwave detection system may have utility for both intrusion detection and person or automobile speed detection.

Figure 21:
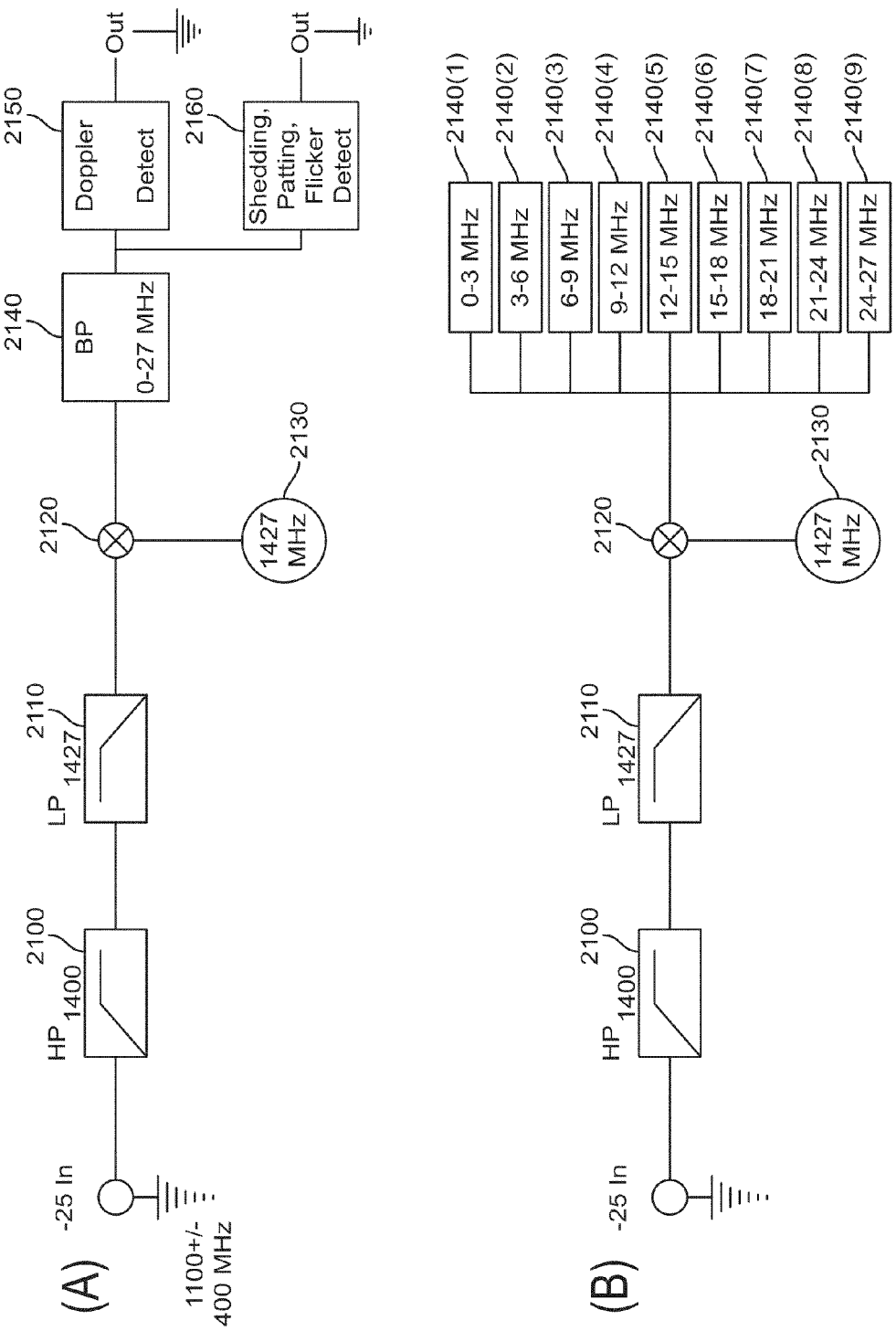
FIG. 21 provides in FIG. 21(A) an exemplary embodiment in which a given spectral line such as at 21 cm for hydrogen is captured and its Doppler effect determined as well as its so-called shedding, flicker or puff frequency at 0-30 Hz.

Referring now to FIG. 21, there is shown in FIG. 21A an exemplary embodiment for capture of the hydrogen spectral line at 21 cm and associated Doppler effect and shedding frequency characteristics. As shown in FIG. 20, 1.420 GHz is one received frequency in the passive microwave region and a WARC protected frequency. A reception at 1.8 GHz can capture both the hydrogen line along with the hydroxyl radical collection of spectral lines which individually or together 1) can provide an indicator of a hot temperature and 2) are at a frequency that can be measured by a detector mounted in a wall per FIG. 1. A signal may be captured at between 700 MHz and 1.5 GHz and high-passed at 1400 MHz high-pass (HP) filter 2100. This output is then low-passed at 1427 MHz at 1427 MHz low-pass (LP) filter 2110. The output is then mixed at mixer 2120 with a 1427 MHz source 2130 and brought down to a baseband 27 MHz pass band. This pass band is then band-pass filtered at band-pass (BP) filter 2140 and, for example, the hydrogen line may be located and its Doppler effect studied at detector 2150. Its flicker, puff or shedding frequency may be detected at shedding frequency detector 2160 as a frequency that may show fire velocity, composition or location (for example, next to a wall) as is known in the art (as well as serve as another fire "signature"). This same circuit may be applied in different form for detection of hydroxyl radical, HCl or any other spectral line detectable by a passive microwave receiver designed to detect its presence in a fire. Thus, for example, frequencies for both hydrogen and hydroxyl radical can be similarly detected by a single detector operating at, for example, 2 GHz. In FIG. 21(B), similar reference numerals denote similar elements. The hydrogen line is again captured but the 27 MHz passband is sampled across the 27 MHz spectrum for example to compare against a predetermined black body characteristic for this spectrum. Though there is little variation between a human body and a fire at this frequency as to black body radiation per this apparatus, there is very large signal to noise ratio because there is no expected man-made noise at this frequency; consequently, small emission of H or OH may be quantified. By way of example, a plurality of filters each with a 3 MHz passband may capture channels between 0 and 27 MHz within a 27 MHz spectrum. The circuit of FIG. 21(B) could just as easily capture 0.5 to 3 GHz and comprise an in-the-wall or through-the-wall detector for detecting a constantly increasing black body emission with increasing frequency in comparison to a stored FIG. 19 for a human body or a fire (candle, gas or other characteristic fire) and one or the other thus distinguished by black body emission. On a broader scale, black body emission may be measured by passive microwave detection from frequencies as low as 0.5 to 3 GHz for in-the-wall or through-the-wall detection and 0.5 to 1000 GHz for mounted on the wall black body or spectral line emission. Because of the similar front ends of the circuits of FIGS. 21(A) and (B), the analog or digital signal processing of the captured frequency bands may be performed remotely at a central processor 1005 shown in FIG. 1 and all expected characteristics data stored in associated memory 1013.

Passive Microwave Receiver at 1420 MHz

Referring now to FIGS. 22-25, a passive microwave receiver at 1420 MHz will be discussed in some detail with respect to experiments related to human and automobile detection, temperature detection and speed detection. First referring to FIG. 22, there is shown an embodiment of a 1420 MHz receiver 2200 which was utilized with a parabolic antenna per FIGS. 23-25. The parabolic antenna exhibits a lobe receiving characteristic which intersects with a known stretch of highway on which an automobile is expected or intersects a known passage way an intruder is expected to follow. A memory, not shown, may store lobe/highway/passage way distances for speed calculation. The parabolic antenna is pointed across the roadway for speed and temperature measurements per below. The passive microwave antenna input comprising black body radiation from an intruder or automobile at 1420 MHz is received at input 2217 having been amplified by the antenna gain. The input is provided to a +22 dB low noise amplifier LNA2 2220 and then filtered at 1420+ or −5 MHz at filter 2222. This translates to a WARC protected frequency between 1415 and 1425 MHz. The filtered signal is mixed at mixer 2225 to bring the input signal down to intermediate frequency. To do so, a signal of 112.536 MHz is generated at oscillator 2205. Splitter 2207 is optional for testing the oscillator output. A multiplier X3 2210 multiplies the 112.536 MHz by three to 337.608 MHz. A 3 dB splitter 2212 splits the output of the multiplier 2210 and one output is multiplied again by three at X3 tripler 2215. The frequency of the output is now 1012.824 MHz. Thus, when mixed at mixer 2225, an output of mixer 2225 is at 408 MHz and so is passed at intermediate frequency filter 2227 at 408 MHz+/−5 MHz (403 to 413 MHz). A 22 dB gain intermediate frequency amplifier 2230 amplifies the output of mixer 2225. The output of amplifier 2230 is mixed with the other 337.608 MHz output of splitter 2212 resulting in a signal at 408-338 or about 70 MHz+ or −2 MHz or a 4 MHz band. This 70 MHz output signal+ or −2 MHz is filtered twice at filter 2235 and 2240 and amplified at amplifier 2237 providing another 22 dB of gain. The resultant 4 MHz signal is provided to power detector 2245 at 100 MV/dBM and output as a DC signal to a data system and displayed per FIGS. 23-25.

Figure 22:
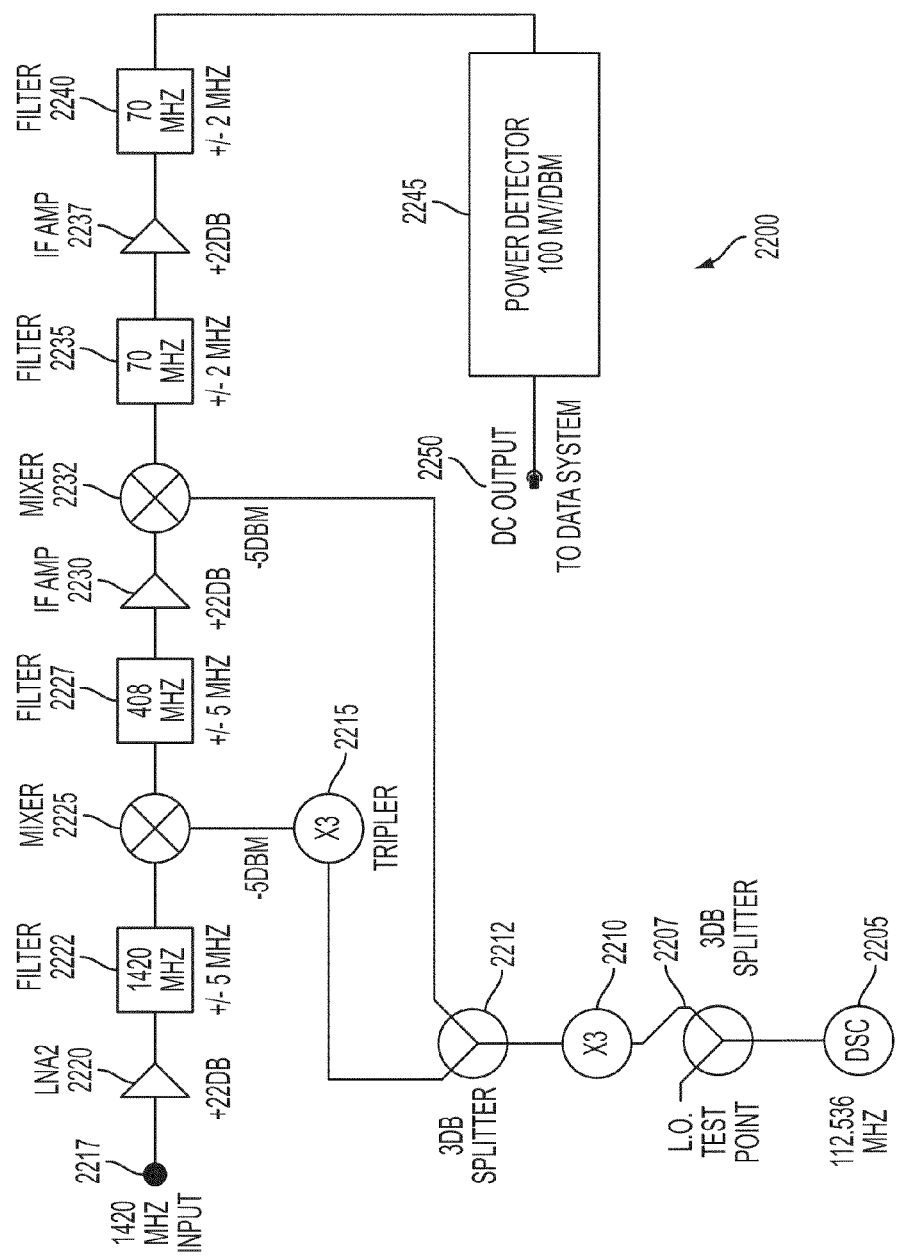
FIG. 22 provides an exemplary schematic of a 1420 MHz passive microwave receiver used to generate the graphs of FIGS. 23-25 for an automobile and a human.
Figure 23:
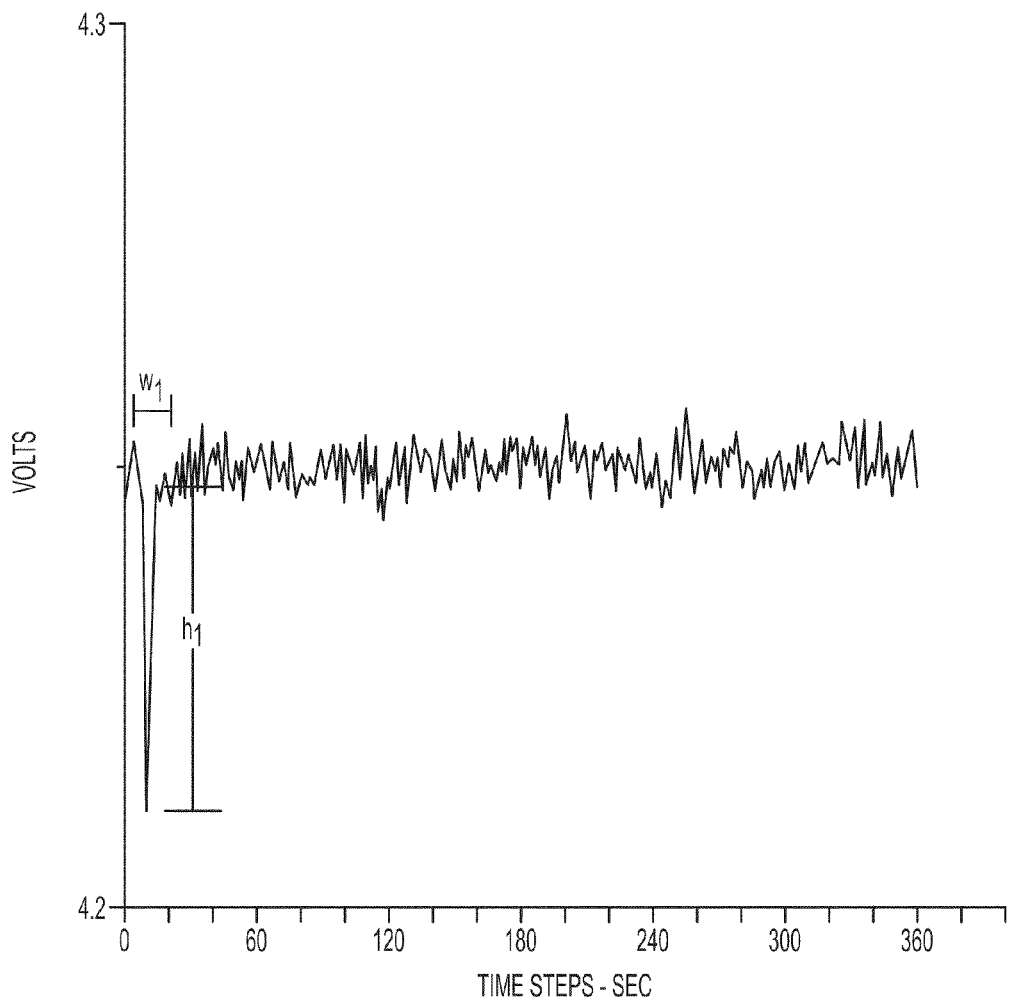
FIG. 23 provides a voltage signal plot over time for a fast automobile traveling in the beam of the passive microwave receiver of FIG. 22 where the voltage pulse peak is narrow indicating a high rate of speed and high indicating a high automobile temperature.

Referring now to FIG. 23, the passive microwave receiver of FIG. 22 was directionally pointed across a street as a high speed automobile passed within the receiving antenna lobe range. An antenna lobe intersection with a street direction provides a known distance of lobe/highway intersection that may be used to calculate speed. FIG. 23 is a graphical plot of voltage level versus time where voltage is between 4.2 and 4.3 volts and time is in seconds. The automobile was detected in the form of a sharp negative drop in voltage exhibiting a negative peak shape. The height $h_1$ of the peak is indicative of the temperature of the automobile and its width $w_1$ is an indication of time the automobile was within the receiving parabolic antenna lobe intersection with the highway. The pulse width $w_1$ is measured as having a duration between 0 seconds and twenty seconds or approximately four seconds. This pulse width of approximately four seconds and the lobe/highway intersection distance being measured in feet may be used to calculate average speed of the automobile within the lobe/highway intersection of the parabolic antenna. Speed is simply distance divided by time and can be so calculated, rather than by using Doppler effect in prior art vehicle speed detectors.

Figure 24:
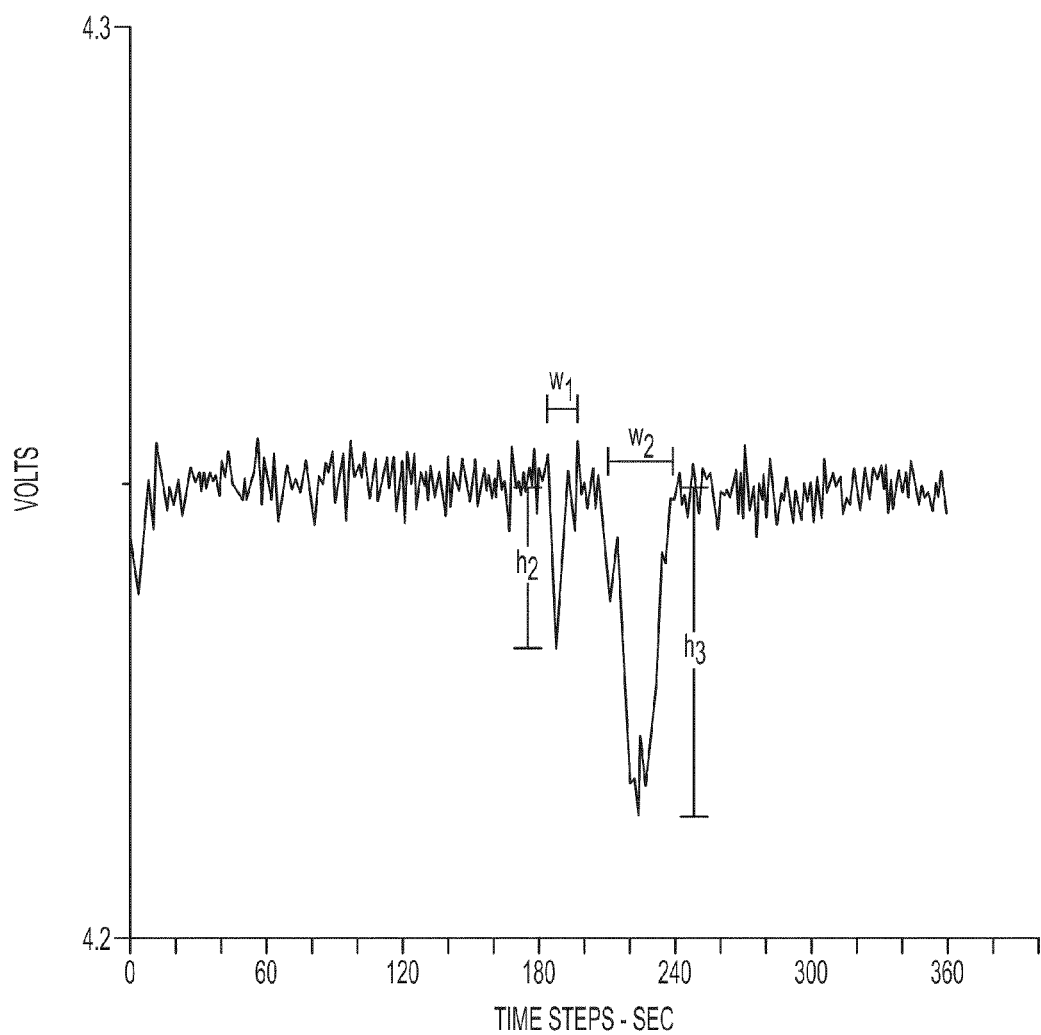
FIG. 24 provides a voltage signal plot over time for a freshly started automobile traveling twice through the beam of the passive microwave receiver of FIG. 22 where the automobile is traveling at a faster speed on the order of 15 MPH through the beam lobe intersection with a highway and then at a slower rate of approximately 5 MPH through the beam.

Referring now to FIG. 24, another graph of voltage versus time is shown for an automobile with the same scales. The automobile was controlled to travel within a more calibrated environment. The automobile was cold-started at time 180 seconds and made to travel in the beam at approximately fifteen to twenty miles per hour in a first direction on the street crossing the antenna pointed across the street. Width $W_1$ represents a time duration of approximately 5 seconds and with the lobe/highway intersection distance known, the resulting calculation of average speed in the antenna lobe is fifteen to twenty miles per hour. The temperature of the car after cold start is represented by $h_2$ which is a shorter negative peak than either the $h_1$ negative peak of FIG. 23 or the second peak caused by the known automobile of negative height $h_3$ occurring later in time. The pulse width $W_2$ at approximately 220 seconds is approximately 15 seconds and with the parabolic lobe/highway intersection distance known a speed of approximately 5 mph may be calculated. Notice that the temperature of the automobile at time equal to 220 seconds has increased to a negative value of $h_3$ which is warmer than $h_2$ but cooler than $h_1$ of the fast automobile of FIG. 23.

FIG. 25 represents a graphical depiction of voltage over time between 4.2 volts and 4.3 volts and time in seconds where a human walked within the parabolic antenna beam lobe at a distance from the antenna of approximately 50 feet beginning at time T=65 seconds approximately along a known path. The human walked within the receiving parabolic antenna lobe for a time duration of approximately fifty-five seconds and so his walking speed within the lobe/path intersection may be calculated to be approximately 2 miles per hour. The temperature or height of each of pulses at $W_3$, $W_4$ and $W_5$ remain approximately the same and exhibit a positive voltage pulse peak of height $h_4$. The human walked back and forth across the antenna beam lobe at approximately 140 and again at 160 seconds. This resulted in a narrow pulse peak at each time marker of approximately the same height as when walking at 50 feet distance. An example application of such an application is the detection of intruders or vehicles at a gate or other narrow passageway by pointing a beam across the passageway or street and detecting the peaks caused by those passing through the passageway.

In each of FIGS. 23-25, it is important to note that the noise level or white noise seen in the steady state or during human walking was approximately constant and minimal due to the limited amount of background passive microwave radiation measurable at 1420 GHz+ or −5 MHz because 1400 to 1427 MHz is a protected WARC frequency band.

Thus, it can be seen that passive detection of microwave radiation from a fire or other heat source such as a human, animal, airplane, or automobile, can be used to provide fire, speed, temperature and intrusion detection. A system of passive microwave detectors in accordance with aspects herein can be used to monitor and protect property. Passive microwave detectors can enable first responders to better identify and fight fires, measure speed and to locate intruders.

Although particular embodiments, aspects, and features have been described and illustrated, it should be noted that the invention described herein is not limited to only those embodiments, aspects, and features. It should be readily appreciated that modifications may be made by persons skilled in the art, and the present application contemplates any and all modifications within the spirit and scope of the underlying invention described and claimed herein.

For example, it should be noted that other frequencies within the microwave range between 300 MHz and 1000 GHz, other combinations of frequencies including visible spectrum and infrared or ultraviolet image processing, known smoke, ionization radiation, thermocouple and other known systems may supplement and provide variations in configuration and protocol and should be deemed within the scope of the present disclosure.

In addition, some embodiments of a passive microwave fire and intrusion detection apparatus ma incorporate other conventional detectors operating inside and outside the microwave region, such as smoke detectors and temperature rise detectors and conventional intrusion detectors using ultrasound emission and reception, for example, between 20 KHz and 10 GHz. Such embodiments are also contemplated to be within the scope and spirit of the present disclosure.

What is claimed is:

1. A method for detecting at least one of temperature, average speed within a receiving antenna lobe and a first source of microwave radiation using passive reception of said microwave radiation, comprising:

receiving a first microwave radiation signal at a first receiver from the first source, said first receiver including a first antenna having said receiving antenna lobe, a first magnitude of said first received microwave radiation signal being indicative of a first temperature of said first source of said first received microwave radiation signal;

receiving a second microwave radiation signal from said first source at said first receiver later in time, a second magnitude of said second microwave radiation signal being indicative of a second temperature of said first source of said first and said second received microwave radiation signals, wherein the difference in time between receipt of said first and said second microwave radiation signals is indicative of speed of said first source within said receiving antenna lobe, said first and said second microwave radiation signals being within a range of frequencies protected from active transmission in a geographic area encompassing a location of said first receiver, said first and said second microwave radiation signals being in a range of frequencies between 0.5 and 3 GHz; and calculating average speed of said first source within said receiving antenna lobe from the difference in time between receipt of said first and said second microwave signals and a distance said first source travels within said receiving antenna lobe.

2. The method according to claim 1, further comprising:
transmitting said first and said second microwave radiation signals to a signal processor;
said first microwave radiation signal being converted to a first voltage signal;
said second microwave radiation signal being converted to a second voltage signal;
said first voltage signal and said second voltage signal indicative of temperature of said first source; and
a duration in time between receipt of said first and said second received microwave signals being used by said signal processor to calculate average speed of said first source within said receiving antenna lobe.

3. The method according to claim 2, wherein said first source comprises a living being and a presence of a living being can be determined if a magnitude of said resulting voltage signal is equal to a reference level representing temperature of the living being.

4. The method according to claim 2, wherein said first source comprises an automobile and a presence of an automobile can be determined if a magnitude of the resulting voltage signal for the automobile is equal to a reference level representing temperature of the automobile.

5. The method according to claim 4, wherein said resulting voltage signal and its relative magnitude compared to a reference level for the automobile and a reference level for a living being distinguishes the automobile from the living being.

6. The method according to claim 1, wherein said first receiver is configured to receive frequencies in a range between 1.400 to 1.427 GHz.

7. The method according to claim 1, further comprising storing a distance value representing a distance along a highway at which boundaries of the receiving antenna lobe exist.

8. A system for passive microwave detection of at least one of temperature, speed and a first source of microwave radiation, comprising:
a first receiver configured to detect a first passively received microwave radiation signal from the first source of microwave radiation, a first voltage peak signal level of said first passively received microwave radiation signal being indicative of a first temperature of said first source;
the first receiver being configured to detect a second passively received microwave radiation signal from the first source later in time, a second voltage peak signal level of said second passively received microwave radiation signal being indicative of a second temperature of said first source of said second passively received microwave radiation signal, a frequency of said received first and said second passively received microwave radiation signals being within a range of frequencies protected from active transmission in a geographic area encompassing a location of said first receiver;
a signal processor, said signal processor being configured to receive said first and said second passively received microwave radiation signals from said first receiver and being further configured to convert said first and said second passively received microwave radiation signals to first and second voltages, respectively, said signal processor further being configured to calculate a voltage signal height representing temperature of said first source and a passively received microwave signal duration indicative of a duration of time of said first source traveling within a receiving parabolic antenna lobe of the first receiver;
the signal processor calculating an average speed of said first source within said receiving parabolic antenna lobe from the difference in time between receipt of said first and said second passively received microwave radiation signals and a distance of travel of said first source within said receiving parabolic antenna lobe where speed of said first source is said first source travel distance divided by the time duration between receiving said first and said second passively received microwave radiation signals.

9. The system according to claim 8, wherein said first receiver comprises one of a parabolic antenna array and a horn-type antenna array.

10. The system according to claim 8, wherein said first receiver is configured to receive frequencies in a range between 1.400 to 1.427 GHz.

11. The system according to claim 8, wherein said first receiver is configured to be placed in a wall of an enclosed space made of one of drywall, brick, block, adobe and concrete, said first receiver being directional and providing said receiving parabolic antenna lobe from the wall of said enclosed space to at least a center of said enclosed space.

12. The system according to claim 11, wherein said first receiver is configured to be placed within the wall of said enclosed space and directed toward the center of an opening to said space comprising one of a window, a gate and a door.

13. The system according to claim 8, further comprising a display, said display being configured to show information regarding at least one of said first source temperature and duration of travel time of said first source within the receiving parabolic antenna lobe, said display comprising a graph of passively received microwave signal voltage versus time of passive microwave signal reception from said first source.

14. The system according to claim 8, wherein said signal processor comprises a superheterodyne receiver.

15. The system according to claim 8, wherein said signal processor includes a memory, and further wherein at least one microwave radiation signal characteristic of a field of view for said first receiver is stored in said memory, said stored microwave radiation signal characteristic of a field of view for said first receiver for identifying speed and temperature of said first source traveling in said field of view of said first receiver.

16. A method for detecting at least one of temperature and speed of an automobile serving as a source of microwave radiation signal using passive reception of microwave radiation, comprising:
receiving a microwave radiation signal from said source at a passive microwave receiver, said passive microwave receiver including at least one antenna having a receiving antenna lobe, a voltage level of said received microwave radiation signal being indicative of a temperature of said source, the frequency of operation of said passive microwave receiver being a World Administrative Radio Conference (WARC) protected frequency between 0.5 and 2 GHz;
storing a receiving antenna lobe pattern in memory comprising the locations of the receiving antenna lobe boundaries that the source of the microwave radiation signal crosses based on received signals at the at least one antenna having said receiving antenna lobe,
measuring a passage of time said source of the microwave radiation signal travels within said receiving antenna lobe, and
calculating a speed of said automobile source from said passage of time and a distance along the highway between the boundaries of the receiving antenna lobe traveled by said source of microwave radiation signal.

17. The method according to claim 16, wherein a presence of said automobile source within said boundaries of the receiving antenna lobe can be determined if said voltage level is negative with respect to a reference level.

18. The method according to claim 16, wherein the frequency of operation of said passive microwave receiver is 1420 MHz.

* * * * *